United States Patent
Sugimoto et al.

(10) Patent No.: US 9,633,417 B2
(45) Date of Patent: Apr. 25, 2017

(54) IMAGE PROCESSING DEVICE AND IMAGE CAPTURE DEVICE PERFORMING RESTORATION PROCESSING USING A RESTORATION FILTER BASED ON A POINT SPREAD FUNCTION

(71) Applicant: FUJIFILM Corporation, Tokyo (JP)

(72) Inventors: Masahiko Sugimoto, Saitama (JP); Kenkichi Hayashi, Saitama (JP); Yousuke Naruse, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/800,873

(22) Filed: Jul. 16, 2015

(65) Prior Publication Data
US 2015/0317776 A1   Nov. 5, 2015

Related U.S. Application Data

(63) Continuation of application No. PCT/JP2013/062467, filed on Apr. 26, 2013.

(30) Foreign Application Priority Data

Feb. 15, 2013  (JP) ................ 2013-027876

(51) Int. Cl.
*G06T 5/00* (2006.01)
*G06T 5/20* (2006.01)
(Continued)

(52) U.S. Cl.
CPC .............. *G06T 5/003* (2013.01); *G06T 5/20* (2013.01); *H04N 5/23229* (2013.01);
(Continued)

(58) Field of Classification Search
CPC ....... G06T 5/003; G06T 5/20; H04N 5/23229; H04N 5/357; H04N 9/045
See application file for complete search history.

(56) References Cited

U.S. PATENT DOCUMENTS

| 8,941,762 B2 | 1/2015 | Hatakeyama |
| 2011/0085743 A1* | 4/2011 | Lei ..................... G06T 5/003 382/264 |

(Continued)

FOREIGN PATENT DOCUMENTS

| CN | 102844788 A | 12/2012 |
| JP | 10-057361 A | 3/1998 |

(Continued)

OTHER PUBLICATIONS

International Search Report issued in PCT/JP2013/062467, mailed on Jul. 2, 2013.

(Continued)

*Primary Examiner* — Nicholas Giles
(74) *Attorney, Agent, or Firm* — Birch, Stewart, Kolasch & Birch, LLP

(57) ABSTRACT

An image processing device according to an embodiment of the present invention obtains recovery image data by performing restoration processing using a restoration filter based on a point spread function of an optical system, on original image data obtained from an imaging element by imaging using the optical system. The restoration filter used in this restoration processing (a combination filter and realization filter Fr) is generated by combining multiple base filters Fb. Base filter Fb may be arbitrarily selected from filters that are confirmed beforehand to be effective to prevent image quality degradation.

19 Claims, 26 Drawing Sheets

(51) Int. Cl.
  *H04N 5/232*  (2006.01)
  *H04N 5/357*  (2011.01)
  *H04N 9/04*   (2006.01)
(52) U.S. Cl.
  CPC ............. *H04N 5/357* (2013.01); *H04N 9/045* (2013.01); *G06T 2207/10004* (2013.01)

(56) References Cited

U.S. PATENT DOCUMENTS

| 2011/0128407 | A1* | 6/2011 | Lescu ................ H04N 5/3572 348/224.1 |
| 2011/0285879 | A1 | 11/2011 | Hatakeyama |
| 2012/0075502 | A1 | 3/2012 | Watanabe |

FOREIGN PATENT DOCUMENTS

| JP | 2011-150635 A | 8/2011 |
| JP | 2012-023498 A | 2/2012 |
| JP | 2012-073691 A | 4/2012 |
| WO | WO 2011/121763 A1 | 10/2011 |

OTHER PUBLICATIONS

Written Opinion issued in PCT/JP2013/062467, mailed on Jul. 2, 2013.

Chinese Office Action issued Aug. 3, 2016 in corresponding Chinese Application No. 201380073128.4 with an English Translation.

* cited by examiner

IMAGE PROCESSING DEVICE AND IMAGE CAPTURE DEVICE PERFORMING RESTORATION PROCESSING USING A RESTORATION FILTER BASED ON A POINT SPREAD FUNCTION

CROSS-REFERENCE TO RELATED APPLICATIONS

This application is a Continuation of PCT International Application No. PCT/JP2013/062467 filed on Apr. 26, 2013, which claims priority under 35 U.S.C. §119(a) to Japanese Patent Application No. 2013-027876 filed on Feb. 15, 2013. Each of the above application(s) is hereby expressly incorporated by reference, in its entirety, into the present application.

BACKGROUND OF THE INVENTION

Field of the Invention

The present invention relates to an image processing device and an image capture device according to restoration processing based on a point spread function.

Description of the Related Art

In an object image taken by means of an image capture optical system, a so-called point spread phenomenon in which a point object minutely extends may be seen by influences such as diffraction and aberration that originate in the image capture optical system. A function that shows a response to a point light source of an optical system is called PSF (Point Spread Function) and is known as a parameter that controls the resolution degradation (blur) of a taken image.

When a taken image subjected to image quality degradation due to this point spread phenomenon is subjected to point image restoration processing based on PSF, the image quality can be recovered. The point image restoration processing is processing to: find a degradation characteristic (point image characteristic) that originates in the aberration or the like of a lens (optical system) beforehand; and cancel the point spread of a taken image by image processing using a restoration filter (recovery filter) corresponding to the point characteristic.

There are suggested various techniques for this point image restoration processing, and, for example, PTL 1 (Japanese Patent Application Laid-Open No. 2011-150635) discloses an image restoration device designed to be able to easily implement image restoration processing. In this image restoration device, a restoration filter is generated using intensity distribution calculated by adding and averaging the intensity distribution of three kinds of degradation point images found from each of three boundaries in an original image, and the image restoration processing is performed.

SUMMARY OF THE INVENTION

Since point image restoration processing is processing to obtain recovery image data by applying a restoration filter to original image data, the image quality of the obtained recovery image data is controlled by the used restoration filter.

There are proposed filters of various models as a restoration filter for point image restoration processing, and, for example, a Wiener filter is widely known. Since conventional restoration filters such as this Wiener filter and the restoration filters of PTL 1 are filters designed for the purpose of point image restoration, they have an excellent characteristic from the viewpoint of "point image restoration", and it is possible to restore an image (point image) accurately.

However, the influence on "image quality excluding point image restoration accuracy" is not sufficiently considered at the time of design of these conventional restoration filters, and point image restoration processing using such a restoration filter may have a negative influence on the image quality excluding the point image restoration accuracy. For example, ringing might appear by the point image restoration processing in an edge part (image boundary part) or the like in an image in which the contrast rapidly changes. Moreover, by performing the point image restoration processing on image data in which return noise (aliasing) occurs, the return noise may be emphasized.

Thus, the point image restoration processing using a conventional restoration filter can excellently perform point image restoration, but the point image restoration may have an unexpected bad influence on image quality.

Especially, point image restoration processing in equipment such as a mobile device without sufficient throughput for a point spread phenomenon caused by an optical system is highly likely to have a bad influence on image quality excluding point image restoration accuracy. Hardware such as an operation processing circuit and a storage device is limited in relatively small equipment such as a mobile device, it does not necessarily have sufficient throughput, the point image restoration processing is performed by a restoration filter in which the number of taps is restricted, and therefore it is likely to have an influence on image quality excluding point image restoration accuracy by the point image restoration processing.

The present invention is made in view of the above-mentioned circumstances, and it is an object to provide a technique that enables highly accurate point image restoration and can prevent a bad influence on image quality excluding point image restoration accuracy.

One mode of the present invention relates to an image processing device that obtains recovery image data by performing restoration processing using a restoration filter based on a point spread function of an optical system, on original image data obtained from an imaging element by imaging using the optical system, where the restoration filter includes a combination filter generated by combining multiple base filters so as to fit to an ideal filter based on the point spread function.

According to this mode, it is possible to achieve both "highly accurate point image restoration processing" and "prevention of image quality degradation" at a high level by using filters which are confirmed beforehand to be effective to prevent the image quality degradation as "multiple base filters".

"Multiple base filters" here are multiple filters that are bases when a restoration filter (combination filter) is derived, and can be arbitrarily selected from filters which are confirmed beforehand to be effective for preventing image quality degradation. "Filters which are confirmed beforehand to be effective for preventing image quality degradation" are not especially limited, and filters that can prevent a bad influence on image quality excluding point image restoration processing accuracy can be suitably adopted as "multiple base filters". For example, by using filters that can prevent the bad influence on the image quality excluding the point image restoration processing accuracy such as "filters that do not cause ringing" and "filters that do not emphasize return noise" as multiple base filters, in point image restoration processing using a generated restoration filter, it is possible to maintain the point image restoration processing accuracy at a high level and prevent image quality degradation such as the occurrence of ringing and the emphasis of return noise.

Moreover, "ideal filter" is a filter based on a point spread function and is a filter arbitrarily found from the viewpoint of the realization of desired point image restoration processing. Therefore, for example, a filter derived from a known model such as a Wiener filter may be assumed as the ideal filter, or other filters that can accurately perform the point image restoration processing may be assumed as ideal filters.

Moreover, "point spread function" showing a response to a point light source of an optical system and the PSF (Point Spread Function) of the optical system can be used, but it is not limited to the PSF and other functions related to the PSF may be used. For example, a function using an OTF (Optical Transfer Function) obtained by Fourier transform of the PSF, an MTF (Modulation Transfer Function) showing the absolute value of the OTF or a PTF (Phase Transfer Function) with the shift of a phase among components of the OTF as a function of spatial frequency, may be used as "point spread function".

Moreover, a technique for performing fitting to an ideal filter is not especially limited, and it is possible to perform fitting to the ideal filter by combining multiple base filters by an arbitrary technique. However, it is preferable to perform fitting such that an effect ("prevention of image quality degradation") provided by multiple base filters are not impaired at the time of this fitting, and, for example, it is also possible to perform fitting to the ideal filter on the basis of a least-squares method from the linear sum of multiple base filters.

It is desirable that the multiple base filters are filters that do not cause ringing in recovery image data obtained in a case where restoration processing using each of the multiple base filters alone is performed on the original image data.

According to this mode, it is possible to achieve both "point image restoration accuracy" and "prevention of ringing" at a high level.

"Ringing" is a phenomenon in which a response like a wave that does not originally exist in the vicinity of the edge (near a boundary part) in a processing target image (image data) occurs and the waveform of an image signal vibrates in a waving manner, and a pseudo-contour (ringing distortion) may be caused by a ringing phenomenon in the vicinity of the edge with a large contrast change.

It is desirable that the multiple base filters are filters that do not emphasize return noise in recovery image data obtained in a case where restoration processing using each of the multiple base filters alone is performed on the original image data.

According to this mode, it is possible to achieve both "point image restoration accuracy" and "emphasis prevention of return noise" at a high level.

"Return noise" is noise (distortion component) caused in a case where the frequency component included in an input signal (image data) is higher than the half value of sampling frequency (Nyquist frequency), and the return noise may be caused by image sampling processing that does not satisfy the sampling theorem.

Another mode of the present invention relates to an image processing device that obtains recovery image data by performing restoration processing using a restoration filter based on a point spread function of an optical system, on original image data obtained from an imaging element by imaging using the optical system, where the restoration filter includes a combination filter generated by combining multiple base filters that do not cause ringing in recovery image data obtained in a case where restoration processing using each of the multiple base filters alone is performed on the original image data.

According to this mode, it is possible to perform restoration processing using the restoration filter based on the point spread function of the optical system while preventing the occurrence of ringing.

Another mode of the present invention relates to an image processing device that obtains recovery image data by performing restoration processing using a restoration filter based on a point spread function of an optical system, on original image data obtained from an imaging element by imaging using the optical system, where the restoration filter includes a combination filter generated by combining multiple base filters that do not emphasize return noise in recovery image data obtained in a case where restoration processing using each of the multiple base filters alone is performed on the original image data.

According to this mode, it is possible to perform restoration processing using the restoration filter based on the point spread function of the optical system while preventing the emphasis of the return noise.

It is desirable that the image processing device includes: an image information acquisition unit that acquires image information including at least one of image analysis data acquired by analyzing the original image data and image acquisition condition data showing an acquisition condition of the original image data; a filter selection unit that selects the restoration filter based on the image information; and a restoration operation unit that obtains recovery image data by performing restoration processing using the restoration filter selected by the filter selection unit, on the original image data, where: the restoration filter includes an ideal filter based on the point spread function and the combination filter; and the filter selection unit selects any one of the ideal filter and the combination filter as the restoration filter used for the restoration processing, based on the image information.

According to this mode, the restoration filter used for restoration processing is selected from any of the ideal filter and the combination filter on the basis of the image information. Therefore, from the image information, by selecting the combination filter in a case where it is determined that there is a high possibility that image degradation is caused by restoration processing, and by selecting the ideal filer in a case where there is a low possibility that image degradation is caused by restoration processing, it is possible to obtain recovery image data of high restoration accuracy and excellent reproducibility.

It is desirable that: the image information acquisition unit acquires the image information including the image analysis data showing whether pixel data with a saturated pixel value or pixel data having a pixel value larger than a threshold is included in the original image data; the filter selection unit selects the combination filter in a case where the image analysis data shows that the pixel data with the saturated pixel value or the pixel data having the pixel value larger than the threshold is included in the original image data; and the filter selection unit selects the ideal filter in a case where the image analysis data does not show that the pixel data with the saturated pixel value or the pixel data having the pixel value larger than the threshold is included in the original image data.

According to this mode, the combination filter is selected in a case where "pixel data with a saturated pixel value or pixel data having a pixel value larger than a threshold" that may become a degradation factor of a restoration image is included in the original image data, the ideal filter is selected in a case where it is included in the original image data, and therefore it is possible to obtain recovery image data of high restoration accuracy and excellent reproducibility.

Moreover, "threshold" here is not especially limited, but "threshold" may be arbitrarily set on the basis of the magnitude of the pixel value that may have an influence on the occurrence of ringing or the like, by the restoration processing using the ideal filter.

It is desirable that an edge detection unit that detects an edge part in an image of the original image data is further included, where: the image information acquisition unit acquires the image information including the image analysis data showing whether pixel data with a saturated pixel value or pixel data having a pixel value larger than a threshold is included in the edge part in the original image data; the filter selection unit selects the combination filter in a case where the image analysis data shows that the pixel data with the saturated pixel value or the pixel data having the pixel value larger than the threshold is included in the edge part in the original image data; and the filter selection unit selects the ideal filter in a case where the image analysis data does not show that the pixel data with the saturated pixel value or the pixel data having the pixel value larger than the threshold is included in the edge part in the original image data.

According to this mode, the combination filter is selected in a case where "pixel data with a saturated pixel value or pixel data having a pixel value larger than a threshold" that may become a degradation factor of the restoration image is included in "edge part" in which the degradation of the restoration image is likely to be caused, the ideal filter is selected in other cases, and therefore it is possible to obtain recovery image data of high restoration accuracy and excellent reproducibility.

It is desirable that: the image information acquisition unit acquires the image information including the image acquisition condition data showing information on the optical system; the filter selection unit selects the ideal filter in a case where the ideal filter corresponds to the optical system; and the filter selection unit selects the combination filter in a case where the ideal filter does not correspond to the optical system.

According to this mode, the ideal filter is selected in a case where the ideal filter corresponds to the optical system, the combination filter is selected in a case where the ideal filter does not correspond to the optical system, and therefore it is possible to obtain recovery image data of high restoration accuracy and excellent reproducibility.

"Whether the ideal filter corresponds to the optical system" can be determined based on whether the optical system assumed at the time of creation of the ideal filter matches the optical system used at the time of acquisition of the original image data. Here, it may be determined that "the ideal filter corresponds to the optical system" only in a case where the optical system assumed at the time of creation of the ideal filter completely matches the optical system used at the time of acquisition of the original image data, it is not limited to only the case of such complete matching, and it may be also determined that "the ideal filter corresponds to the optical system" in a case where an optical system assumed to have a low possibility of causing the degradation of the recovery image by restoration processing by the ideal filter is used.

It is desirable that the filter selection unit selects one of the ideal filter and the combination filter as a restoration filter used for the restoration processing, for each of the original image data.

According to this mode, any one of the ideal filter and the combination filter is selected as a restoration filter, every original image data.

It is preferable that, based on the image information on a noted pixel and a peripheral pixel of the noted pixel in the original image data, the filter selection unit selects any one of the ideal filter and the combination filter as a restoration filter used for the restoration processing with respect to the noted pixel, for each pixel data forming the original image data.

According to this mode, any one of the ideal filter and the combination filter is selected as a restoration filter, every pixel data forming the original image data.

It is desirable that: the imaging element includes color filters of multiple colors; and the restoration filters have a frequency characteristic corresponding to an array of the color filters.

According to this mode, it is possible to generate the restoration filter taking into account the characteristic of the color filter array used by the imaging element.

The colors and array used in the color filter are not especially limited, and it is possible to use an arbitrary color filter which transmits light of a specific wavelength region and which is arranged by an arbitrary pattern.

It is desirable that: respective frequency characteristics of multiple base filters are mutually different; and the combination filter is obtained from a linear sum of the multiple base filters.

According to this mode, since the restoration filter can be obtained from the linear sum of multiple base filters with different frequency characteristics, it is possible to obtain and use a restoration filter to which an effect provided by the base filters is reflected.

It is desirable that a weighting coefficient with respect to each of the multiple base filters is calculated by a least-squares method.

Like this mode, it is possible to obtain a restoration filter of good accuracy by calculating the weighting coefficient with respect to each of multiple base filters by the least-squares method.

It is desirable that the multiple base filters are filters having a frequency characteristic for contour correction.

According to this mode, since filters (filters for contour correction) having a frequency characteristic of contour correction are used as multiple base filters, it is possible to obtain a highly accurate restoration filter easily.

"Filters having a frequency characteristic of contour correction" described here are not especially limited as long as they are filters to make the image quality of the contour part (edge part) in an image (original image data) excellent, and, for example, it is possible to adopt a filter that emphasizes the contour part.

It is desirable that the restoration filter has a filter coefficient corresponding to the pixel number of the original image data.

According to this mode, since the filter coefficient of the restoration filter is defined according to the number of pixels of the original image data, a characteristic corresponding to the number of pixels of the original image data can be reflected to the restoration filter. For example, in a case where the number of pixels of the original image data is relatively small, a base filter that emphasizes the high-frequency component is not selected, and weight with respect to the base filter that emphasizes the high-frequency component can be reduced.

It is desirable that the optical system has a lens unit that modulates a phase and expands the depth of field.

According to this mode, it is possible to achieve both "highly accurate point image restoration processing" and "prevention of image quality degradation" even for original image data obtained through a so-called EDoF (Extended Depth of Field (Focus)) optical system. Here, a technique for modulating a phase in the lens unit (optical phase modulation means) is not especially limited, and it is also possible to install a phase modulation unit between lenses and cause a lens itself (for example, incident surface/output surface of the lens) to have a phase modulation function.

Another mode of the present invention relates to an image capture device including: an image processing device according to any one of the above; and the imaging element that receives light through the optical system and outputs the original image data of an object image.

According to this mode, it is possible to perform the above-mentioned restoration processing of each mode in the image capture device. Here, the optical system such as a lens may be installed integrally with the image capture device or may be installed separately from the image capture device.

Another mode of the present invention relates to a filter generating device that generates a restoration filter used in restoration processing performed to obtain recovery image data from original image data obtained from an imaging element by imaging using an optical system, including: a storage unit that stores multiple base filters; an ideal filter calculation unit that calculates an ideal filter based on a point spread function of the optical system; and a restoration filter generation unit that generates the restoration filter by combining the multiple base filters so as to fit to the ideal filter.

According to this mode, it is possible to achieve both "highly accurate point image restoration processing" and "prevention of image quality degradation" at a high level by using filters which are confirmed beforehand to be effective to prevent the image quality degradation as "multiple base filters".

Another mode of the present invention relates to a filter generating device that generates a restoration filter used in restoration processing performed to obtain recovery image data from original image data obtained from an imaging element by imaging using an optical system, including: a storage unit that stores multiple base filters; and a restoration filter generation unit that generates the restoration filter by combining the multiple base filters, where the restoration filter is generated by combining multiple base filters that do not cause ringing in recovery image data obtained in a case where restoration processing using each of the multiple base filters alone is performed on the original image data.

Another mode of the present invention relates to a filter generating device that generates a restoration filter used in restoration processing performed to obtain recovery image data from original image data obtained from an imaging element by imaging using an optical system, including: a storage unit that stores multiple base filters; and a restoration filter generation unit that generates the restoration filter by combining the multiple base filters, where the restoration filter is generated by combining multiple base filters that do not emphasize return noise in recovery image data obtained in a case where restoration processing using each of the multiple base filters alone is performed on the original image data.

Another mode of the present invention relates to an image restoration method including: a step of acquiring original image data obtained from an imaging element by imaging using an optical system; and a step of obtaining recovery image data by performing restoration processing using a restoration filter based on a point spread function of the optical system, on the original image data, where the restoration filter includes a combination filter generated by combining multiple base filters so as to fit to an ideal filter based on the point spread function.

Another mode of the present invention relates to an image restoration method including: a step of acquiring original image data obtained from an imaging element by imaging using an optical system; and a step of obtaining recovery image data by performing restoration processing using a restoration filter based on a point spread function of the optical system, on the original image data, where the restoration filter includes a combination filter generated by combining multiple base filters that do not cause ringing in recovery image data obtained in a case where restoration processing using each of the multiple base filters alone is performed on the original image data.

Another mode of the present invention relates to an image restoration method including: a step of acquiring original image data obtained from an imaging element by imaging using an optical system; and a step of obtaining recovery image data by performing restoration processing using a restoration filter based on a point spread function of the optical system, on the original image data, where the restoration filter includes a combination filter generated by combining multiple base filters that do not emphasize return noise in recovery image data obtained in a case where restoration processing using each of the multiple base filters alone is performed on the original image data.

Another mode of the present invention relates to a program that causes a computer to execute: a process of acquiring original image data obtained from an imaging element by imaging using an optical system; and a process of obtaining recovery image data by performing restoration processing using a restoration filter based on a point spread function of the optical system, on the original image data, where the restoration filter includes a combination filter generated by combining multiple base filters so as to fit to an ideal filter based on the point spread function.

Another mode of the present invention relates to a program that causes a computer to execute: a process of acquiring original image data obtained from an imaging element by imaging using an optical system; and a process of obtaining recovery image data by performing restoration processing using a restoration filter based on a point spread function of the optical system, on the original image data, where the restoration filter includes a combination filter generated by combining multiple base filters that do not cause ringing in recovery image data obtained in a case where restoration processing using each of the multiple base filters alone is performed on the original image data.

Another mode of the present invention relates to a program that causes a computer to execute: a process of acquiring original image data obtained from an imaging element by imaging using an optical system; and a process of obtaining recovery image data by performing restoration processing using a restoration filter based on a point spread function of the optical system, on the original image data, where the restoration filter includes a combination filter generated by combining multiple base filters that do not emphasize return noise in recovery image data obtained in a case where restoration processing using each of the multiple base filters alone is performed on the original image data.

Another mode of the present invention relates to a non-temporary recording medium in which a computer-readable code of the program of the above-mentioned mode is recorded. As such a recording medium, it is possible to use various magneto-optical recording media and semiconductor recording media such as a CD (Compact Disk), a DVD (Digital Versatile Disk), an HD (Hard Disk), an SSD (Solid State Drive) and a USB memory stick.

According to one mode of the present invention, it is possible to generate a restoration filter (combination filter) that can achieve "highly accurate point image restoration processing" and "prevention of image quality degradation" at a high level by using filters which are confirmed beforehand to be effective to prevent the image quality degradation as "multiple base filters", and it is possible to perform restoration processing using such a restoration filter.

For example, in a case where multiple base filters that do not cause ringing are combined to generate a restoration filter, it is possible to perform restoration processing that prevents the occurrence of ringing. Moreover, in a case where multiple base filters that do not emphasize return noise are combined to generate a restoration filter, it is possible to perform restoration processing that prevents the emphasis of the return noise.

According to another mode of the present invention, a restoration filter used for restoration processing is selected from any of an ideal filter and a combination filter on the basis of image information, and it is possible to obtain recovery image data of high restoration accuracy and excellent reproducibility.

DETAILED DESCRIPTION OF THE EMBODIMENTS

Embodiments of the present invention are described with reference to the accompanying drawings. In the following explanation, an example of applying the present invention to a digital camera (image capture device) that can be connected with a computer (PC: personal computer) is described as one example.

Figure 1:
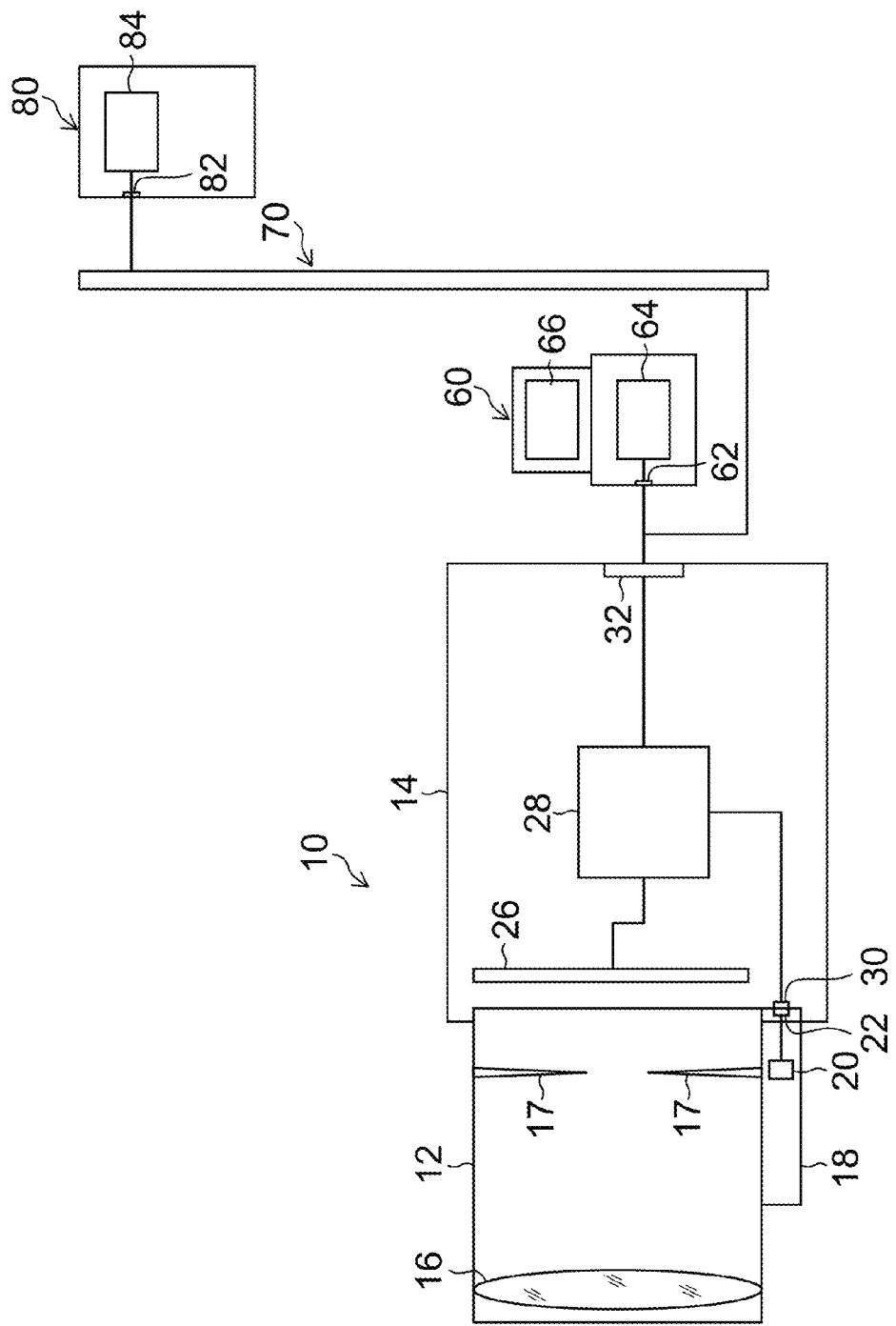
FIG. 1 is a block diagram illustrating the outline of a digital camera connected with a computer.

FIG. 1 is a block diagram illustrating the outline of the digital camera connected with the computer.

A digital camera 10 includes an exchangeable lens unit 12 and a camera body 14 including an imaging element 26, where the lens unit 12 and the camera body 14 are electrically connected through a lens unit input/output unit 22 of the lens unit 12 and a camera body input/output unit 30 of the camera body 14.

The lens unit 12 includes an optical system such as a lens 16 and a diaphragm 17, and an optical system operation unit 18 that controls this optical system, where the optical system operation unit 18 includes a lens unit controller 20 connected with the lens unit input/output unit 22 and an actuator (illustration is omitted) that operates the optical system. The lens unit controller 20 controls the optical system through the actuator on the basis of a control signal sent from the camera body 14 through the lens unit input/output unit 22, and, for example, performs focus control or zoom control by lens movement and performs diaphragm amount control of the diaphragm 17, and so on.

The imaging element 26 of the camera body 14 includes a microlens for light collection, a color filter such as RGB and an image sensor (photodiode; a CMOS (Complementary Metal Oxide Semiconductor) and a CCD (Charge Coupled Device), and so on), converts object image light irradiated through the optical system (the lens 16 and the diaphragm 17, and so on) of the lens unit 12 into an electrical signal, and sends an image signal to a camera body controller 28.

Figure 2:
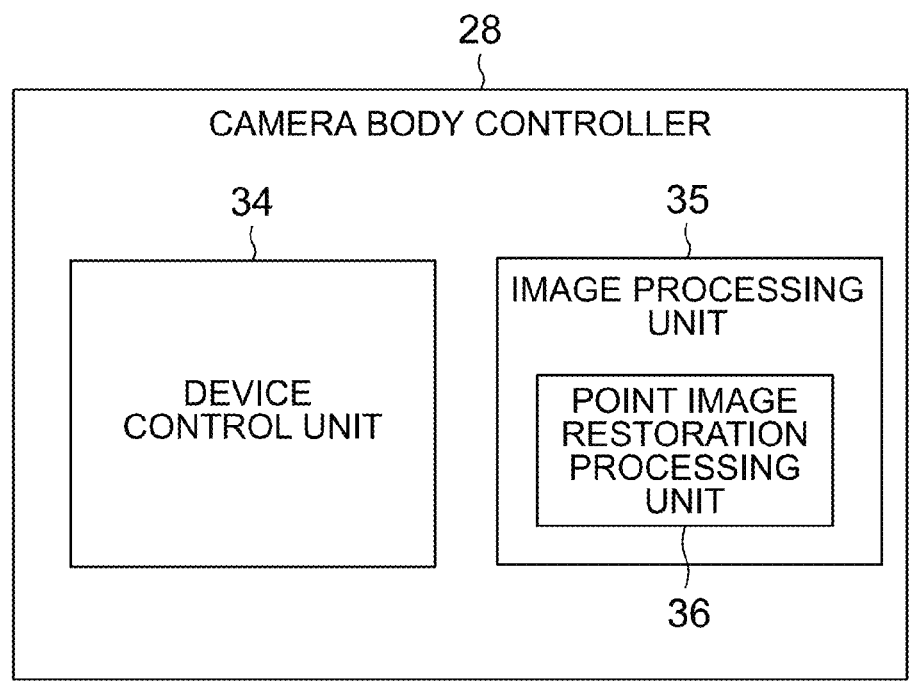
FIG. 2 is a block diagram illustrating a functional configuration example of a camera body controller.

The camera body controller 28 controls the camera body 14 in an integral manner and includes a device control unit 34 and an image processing unit (image processing device) 35 as illustrated in FIG. 2. For example, the device control unit 34 controls the output of an image signal (image data) from the imaging element 26, generates a control signal to control the lens unit 12 and transmits it to the lens unit 12 (the lens unit controller 20) through the camera body input/output unit 30, and transmits image data (RAW data and JPEG data, and so on) before and after image processing to external equipment (the computer 60, and so on) connected through an input/output interface 32. Moreover, the device control unit 34 arbitrarily controls various kinds of devices included in the digital camera 10, such as an unillustrated display unit (EVF: Electronic View Finder, and a back liquid crystal display unit), and so on.

Meanwhile, the image processing unit 35 can perform arbitrary image processing according to the necessity on an image signal from the imaging element 26. For example, various kinds of image processing are arbitrarily performed in the image processing unit 35, such as sensor correction processing, demosaic (synchronization) processing, pixel interpolation processing, color correction processing (white balance processing, color matric processing and gamma conversion processing, and so on), RGB image processing (sharpness processing, tone correction processing, exposure correction processing and contour correction processing, and so on), RGB/YCrCb conversion processing and image compression processing. Additionally, the image processing unit 35 of this example includes a point image restoration processing unit 36 that performs so-called point image restoration processing on an image signal (original image data). Details of this point image restoration processing are described later.

As illustrated in FIG. 1, image data subjected to image processing in the camera body controller 28 is sent to the computer 60 connected with the input/output interface 32, and so on. The format of the image data sent from the digital camera 10 (the camera body controller 28) to the computer 60 or the like is not especially limited, and it may be assumed to be an arbitrary format such as RAW, JPEG and TIFF. Therefore, like a so-called Exif format, the camera body controller 28 may associate multiple items of relevant data such as header information (radiographing information (the radiographing date and time, the model, the number of pixels and the diaphragm value, and so on), and so on), main image data and thumbnail image data with each other to form one image file, and transmit this image file to the computer 60.

The computer 60 is connected with the digital camera 10 through the input/output interface 32 of the camera body 14 and a computer input/output unit 62, and receives data such as the image data sent from the camera body 14. A computer controller 64 of the computer 60 controls the computer 60 in an integral manner, performs image processing of the image data from the digital camera 10 and performs communication control with a server 80 or the like connected with the computer input/output unit 62 through a network line such as an Internet 70, and so on. The computer 60 has a display 66, and processing content or the like in the computer controller 64 is displayed on the display 66 according to the necessity. By operating input means (illustration is omitted) such as a keyboard while confirming the display of the display 66, the user can input data and commands in the computer controller 64, control the computer 60 and control equipment (the digital camera 10 and the server 80) connected with the computer 60.

The server 80 has a server input/output unit 82 and a server controller 84. The server input/output unit 82 forms a transmission/reception connection unit with respect to external equipment such as the computer 60, and is connected with the computer input/output unit 62 of the computer 60 through a network line such as the Internet 70. The server controller 84 cooperates with the computer controller 64 according to a control instruction signal from the computer 60, transmits and receives data with the computer controller 64 according to the necessity, downloads the data to the computer 60, performs operation processing and transmits the operation result to the computer 60.

Here, each controller (the lens unit controller 20, the camera body controller 28, the computer controller 64 and the server controller 84) includes circuits necessary for control processing and, for example, includes an operation processing circuit (a CPU, and so on) and a memory, and so on. Moreover, communication among the digital camera 10, the computer 60 and the server 80 may be wired or wireless. Moreover, the computer 60 and the server 80 may be formed in an integral manner, or the computer 60 and/or the server 80 may be omitted. Moreover, the digital camera 10 may be caused to have a function of communication with the server 80, and data may be directly transmitted and received between the digital camera 10 and the server 80.

Here, a program according to an embodiment of the present invention can be used after being recorded in non-temporary recording media such as various magneto-optical recording media and semiconductor recording media included in the image processing unit 35, the computer 60 or a storage unit 250 of a smart phone 201 described later.

Next, point image restoration processing of captured data (image data) of an object image obtained through the imaging element 26 is described.

In this example, an example in which the point image restoration processing is implemented in the camera body 14 (the camera body controller 28) is described, but all or part of the point image restoration processing can be implemented in other controllers (the lens unit controller 20, the computer controller 64 and the server controller 84, and so on).

The point image restoration processing is processing to obtain recovery image data by performing restoration processing using a restoration filter based on the point spread function of an optical system, on original image data obtained from the imaging element 26 by radiographing using the optical system (the lens 16 and the diaphragm 17, and so on).

Figure 3:
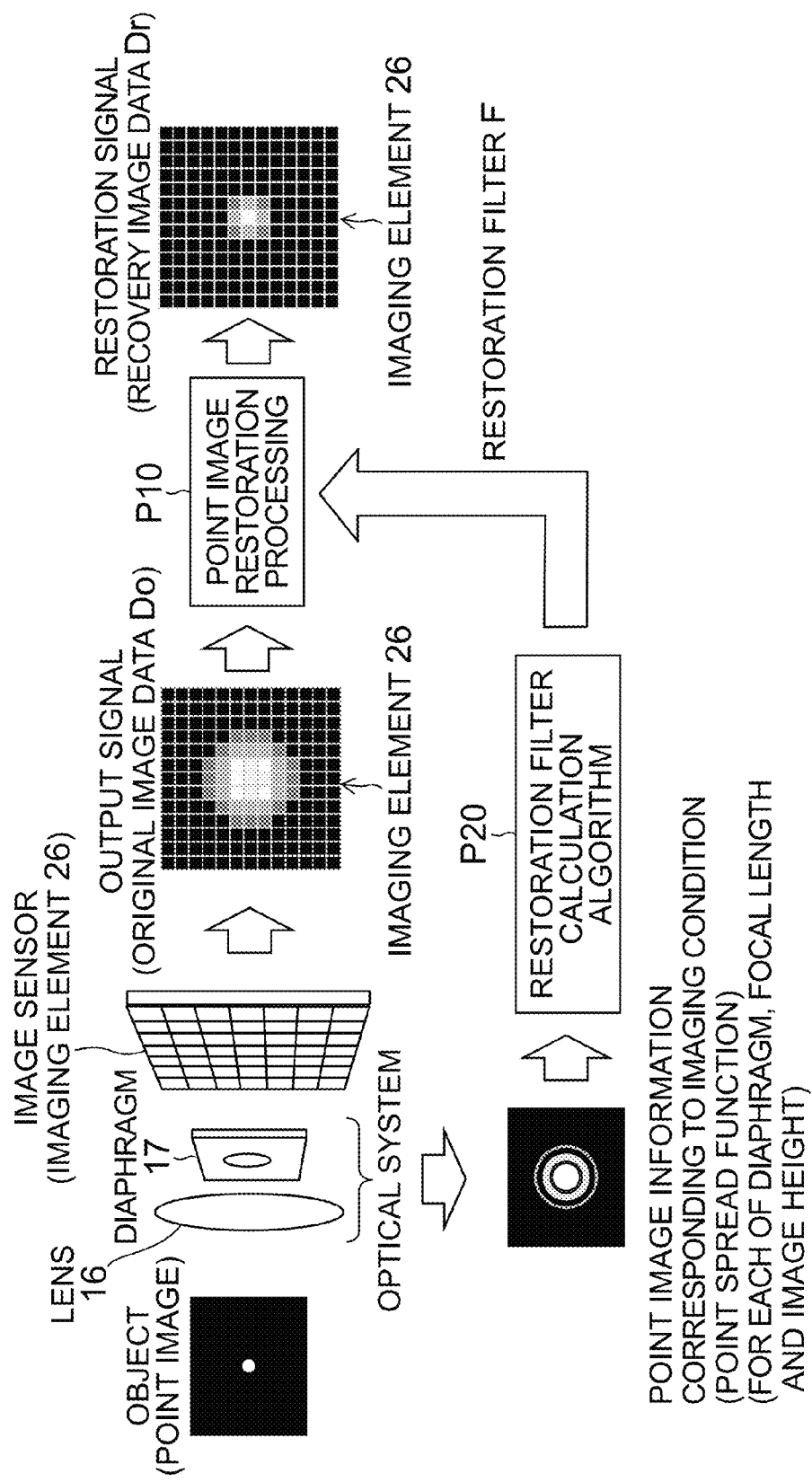
FIG. 3 is a diagram illustrating an outline from image radiographing to point image restoration processing.

FIG. 3 is a diagram illustrating an outline from image radiographing to point image restoration processing. In a case where radiographing is performed with a point image illustrated in FIG. 3 as an object, the object image is subjected to light reception by the imaging element 26 (image sensor) through an optical system (the lens 16 and the diaphragm 17, and so on) and original image data Do is output from the imaging element 26. This original image data Do becomes image data in a state where the essential object image is blurred, by a point spread phenomenon that originates in the characteristic of the optical system.

By performing point image restoration processing P10 using restoration filter F on original image data Do in order to restore the essential object image (point image) from original image data Do of this blurred image, recovery image data Dr showing an image (recovery image) closer to the essential object image (point image) is obtained.

Restoration filter F used in point image restoration processing P10 is obtained by restoration filter calculation algorithm P20 from point image information (point spread function) on an optical system corresponding to imaging conditions when original image data Do is acquired. The point image information (point spread function) on the optical system may vary not only by the kind of the lens 16 but also by various imaging conditions such as the diaphragm amount, the focal distance, the zoom amount, the image height, the recording pixel number and the pixel pitch, and therefore these imaging conditions are acquired when restoration filter F is calculated.

Figure 4:
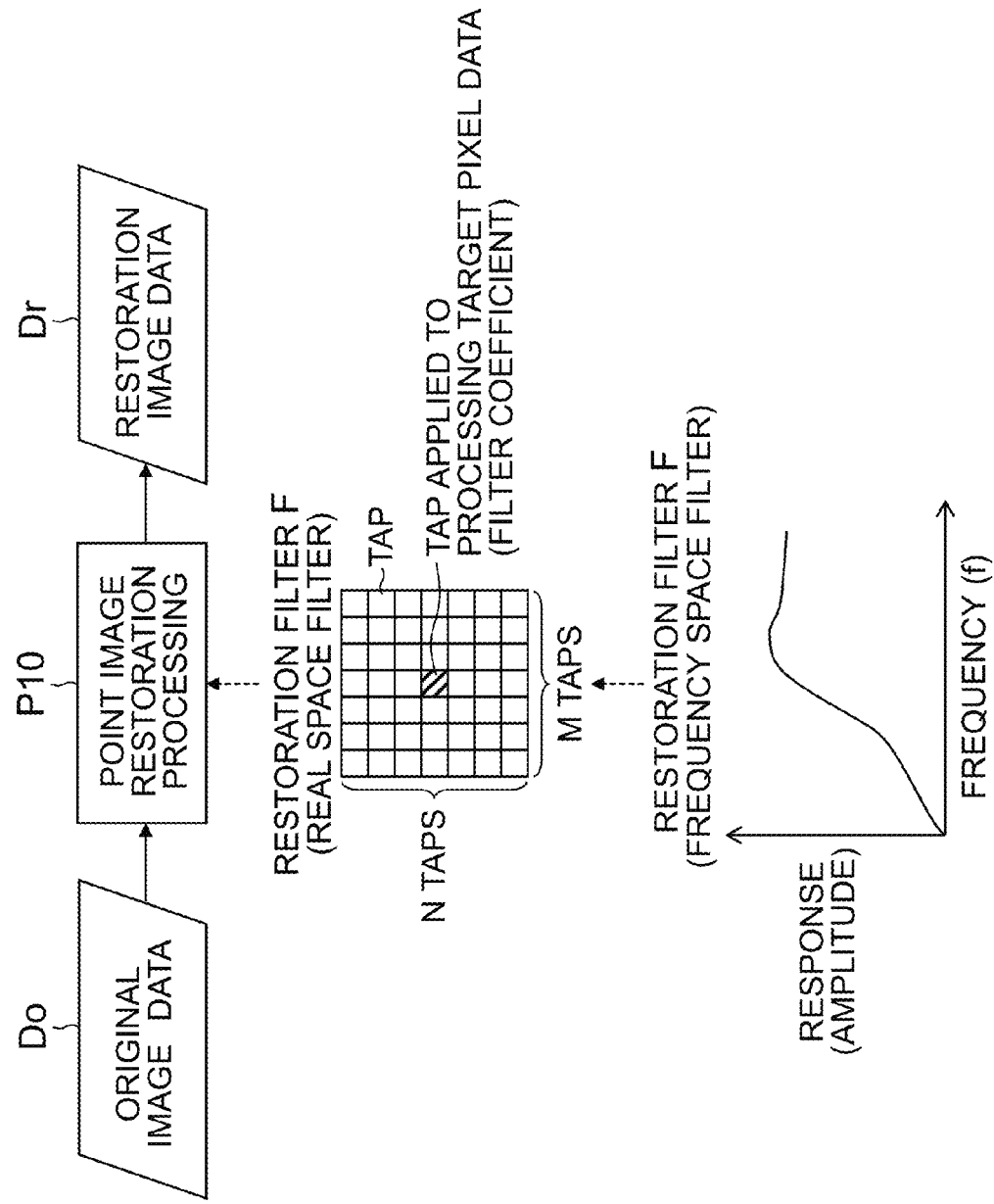
FIG. 4 is a block diagram illustrating the outline of one example of point image restoration processing.

FIG. 4 is a block diagram illustrating the outline of one example of the point image restoration processing.

As mentioned above, point image restoration processing P10 is processing to create recovery image data Dr from original image data Do by filtering processing using restoration filter F, and, for example, restoration filter F on a real space, which is formed with N×M (N and M are integers equal to or greater than 2) taps, is applied to image data of the processing target. By this means, pixel data after the point image restoration processing (recovery image data Dr) can be calculated by performing weighted average operation (deconvolution operation) of the filter coefficient assigned to each tap and corresponding pixel data (processing target pixel data and adjacent pixel data of original image data Do). The point image restoration processing can be performed by sequentially substituting the target pixel and applying the weighted average processing using this restoration filter F to all pixel data forming image data.

Here, the restoration filter on the real space, which is formed with N×M taps, can be derived by performing reverse-Fourier transform of a restoration filter on the frequency space. Therefore, the restoration filter on the real space can be arbitrarily calculated by specifying the basic restoration filter on the subjacent frequency space and designating the number of formation taps of the restoration filter on the real space.

Next, an evil on image quality, which may be caused by the point image restoration processing, is described.

Figure 5:
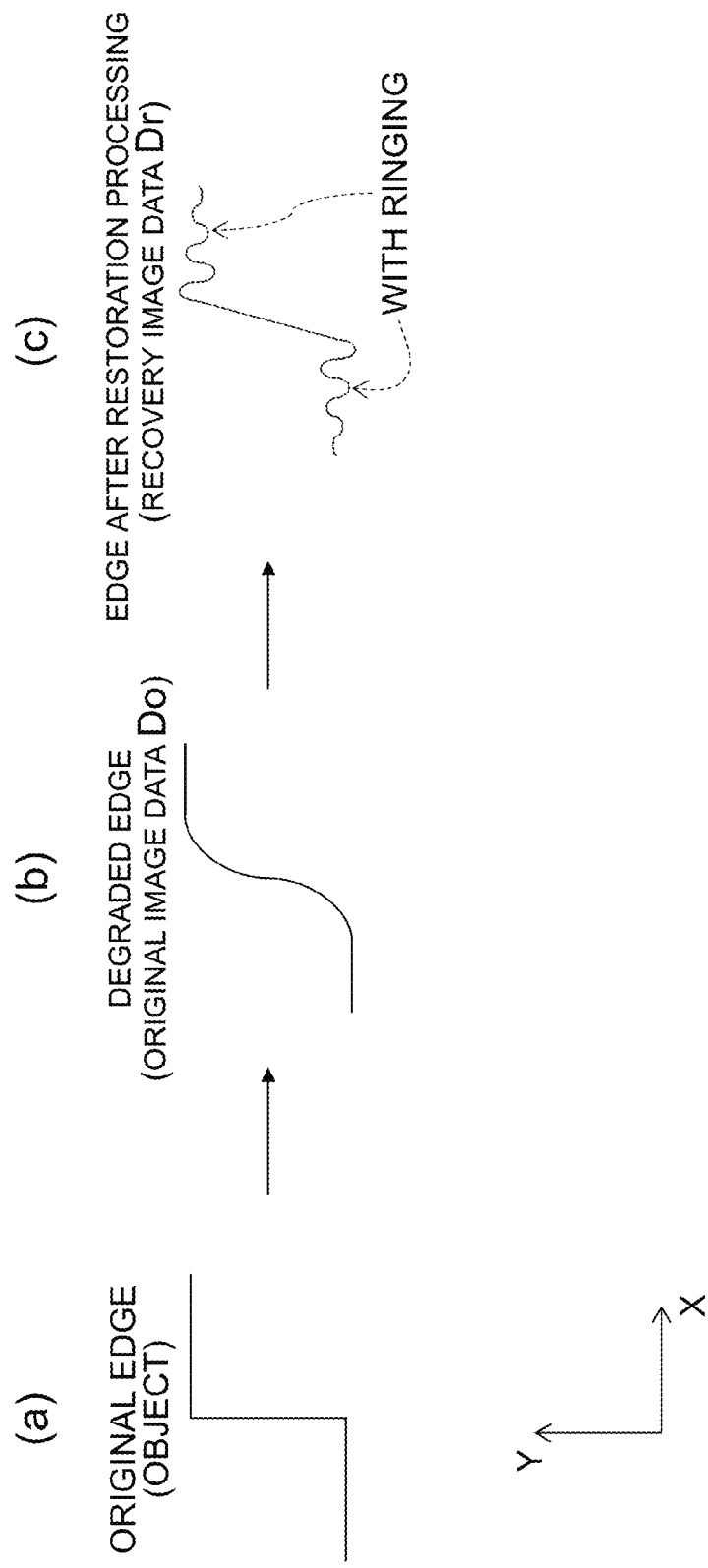
FIG. 5 is a diagram illustrating one example of a contrast change of the edge part in an object image.

FIG. 5 is a diagram illustrating one example of an image quality change in the edge part (image boundary part) in an object image, (a) portion of FIG. 5 illustrates the contrast which the object image originally has, (b) portion of FIG. 5 illustrates the contrast in original image data Do before point image restoration processing and (c) portion of FIG. 5 illustrates the contrast in recovery image data Dr after the point image restoration processing. Here, the horizontal direction (X direction) in FIG. 5 shows the position (one-dimensional position) in the object image and the vertical direction (Y direction) shows the degree of contrast.

An image blur is caused by the point spread phenomenon of an optical system at the time of radiographing in "the edge part with a difference in the contrast" (see (a) portion of FIG. 5) in the object image, and the contrast change becomes relatively gradual in a taken image (original image data Do) (see (b) portion of FIG. 5).

Point image restoration processing is performed to solve the image blur by this point spread phenomenon (see FIG. 3 and FIG. 4), but, in the point image restoration processing using a general restoration filter based on a Wiener filter, and so on, there may occur troubles that ringing (response like a wave which does not originally exist in the vicinity of the edge) is caused in recovery image data Dr after the point image restoration processing (see (c) portion of FIG. 5) and return noise is emphasized, and so on.

That is, the Wiener filter, and so on, is famous as a restoration filter for the point image restoration processing, but, in a case where a restoration filter on the real space is created by a window function or least-squares method based on the Wiener filter, and so on, since the restoration filter has to be created by a limited number of taps, there is a concern of causing image quality degradation such as the occurrence of ringing and the emphasis of return noise. This phenomenon tends to remarkably appear in the point spread phenomenon brought by optical system in point image restoration processing using a restoration filter in which an enough number of taps is not secured, and it is likely to appear in point image restoration processing in equipment such as a mobile device in which available hardware is restricted.

As a result of the earnest research after newly finding these phenomena, the present inventors newly acquire knowledge that it is possible to effectively prevent image quality degradation such as the occurrence of ringing and the emphasis of return noise by using a restoration filter (combination filter) generated by combining multiple base filters in point image restoration processing so as to fit to an ideal filter based on the point spread function of an optical system.

Figure 6:
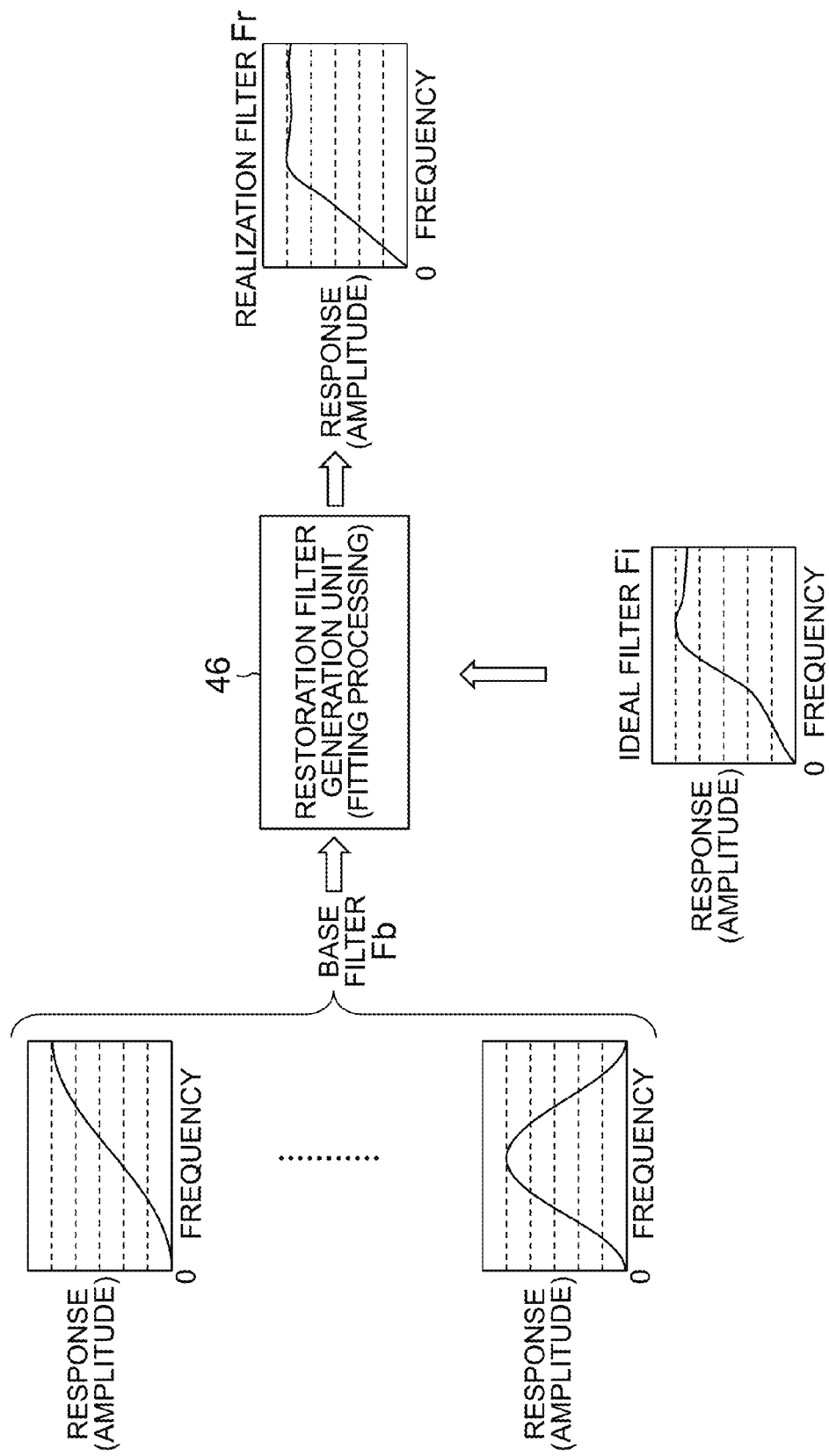
FIG. 6 is a conceptual diagram of a process to generate a restoration filter from multiple base filters.

FIG. 6 is a conceptual diagram of a process to generate a restoration filter from multiple base filters. The vertical axis of each filter illustrated in FIG. 6 shows the response (amplitude) and the horizontal axis shows the frequency. Here, in FIG. 6, a one-dimensional frequency characteristic is exemplified for ease of understanding.

Ideal filter Fi is not especially limited as long as it is a filter based on the point spread function of an optical system, and, for example, it can be calculated on the basis of the Wiener filter expressed by the following expression.

$$d(\omega_x, \omega_y) = \frac{H^*(\omega_x, \omega_y)}{\|H(\omega_x, \omega_y)\|^2 + 1/SNR(\omega_x, \omega_y)} \quad \text{[Expression 1]}$$

In the above expression, $\omega x$ and $\omega y$ show the frequencies in the x direction and the y direction, $d(\omega x, \omega y)$ shows the frequency characteristic of a restoration filter, and $H(\omega x, \omega y)$ shows an OTF that can be derived from a PSF. Moreover, $H^*(\omega x, \omega y)$ shows a complex conjugate of this OTF, and SNR ($\omega x$, $\omega y$) shows the SN ratio.

A PSF (Point Spread Function) that is a function showing a response to the point light source of an optical system can be used as the point spread function of the optical system that is the basis of calculation of ideal filter Fi. Here, the point spread function of the optical system is not limited to the PSF, and it may be an OTF (Optical Transfer Function) (MTF: Modulation Transfer Function; PTF: Phase Transfer Function), and so on, which is obtained by the Fourier transform of the PSF.

Base filter Fb is a filter which is confirmed beforehand to be effective to prevent image quality degradation, and it is arbitrarily selected from filters whose frequency characteristics are different from each other. For example, multiple base filters Fb can be assumed as filters that do not cause ringing in recovery image data obtained in a case where restoration processing (for example, multiplication processing) using each of them alone is performed on original image data. The filter that does not cause ringing is a filter in which the occurrence of a vibration waveform (ringing) of an image signal that does not exist in an image (image data) before filter processing is suppressed in the edge vicinity (boundary neighborhood) in an image (image data) after the filter processing. Moreover, multiple base filters can be assumed as filters that do not emphasize return noise in the recovery image data obtained in a case where the restoration processing (for example, multiplication processing) using each of them alone is performed on the original image data. The return noise is noise (distortion component) caused in a case where the frequency component included in an input signal (image data) is higher than the half value (Nyquist frequency) of a sampling frequency. The filter that does not emphasize the return noise is a filter that reduces the return noise caused by image sampling processing that does not satisfy the sampling theorem. As such multiple base filters, for example, filters used for contour correction processing may be used.

By adopting these filters that have been confirmed to be effective to prevent image quality degradation as base filters Fb and combining these base filters Fb so as to fit to ideal filter Fi found beforehand in a restoration filter generation unit 46, a restoration filter (realization filter Fr) is generated. By using this restoration filter for point image restoration processing, it is possible to perform highly accurate point image restoration processing while realizing the prevention of image quality degradation secured by base filters Fb.

Figure 7:
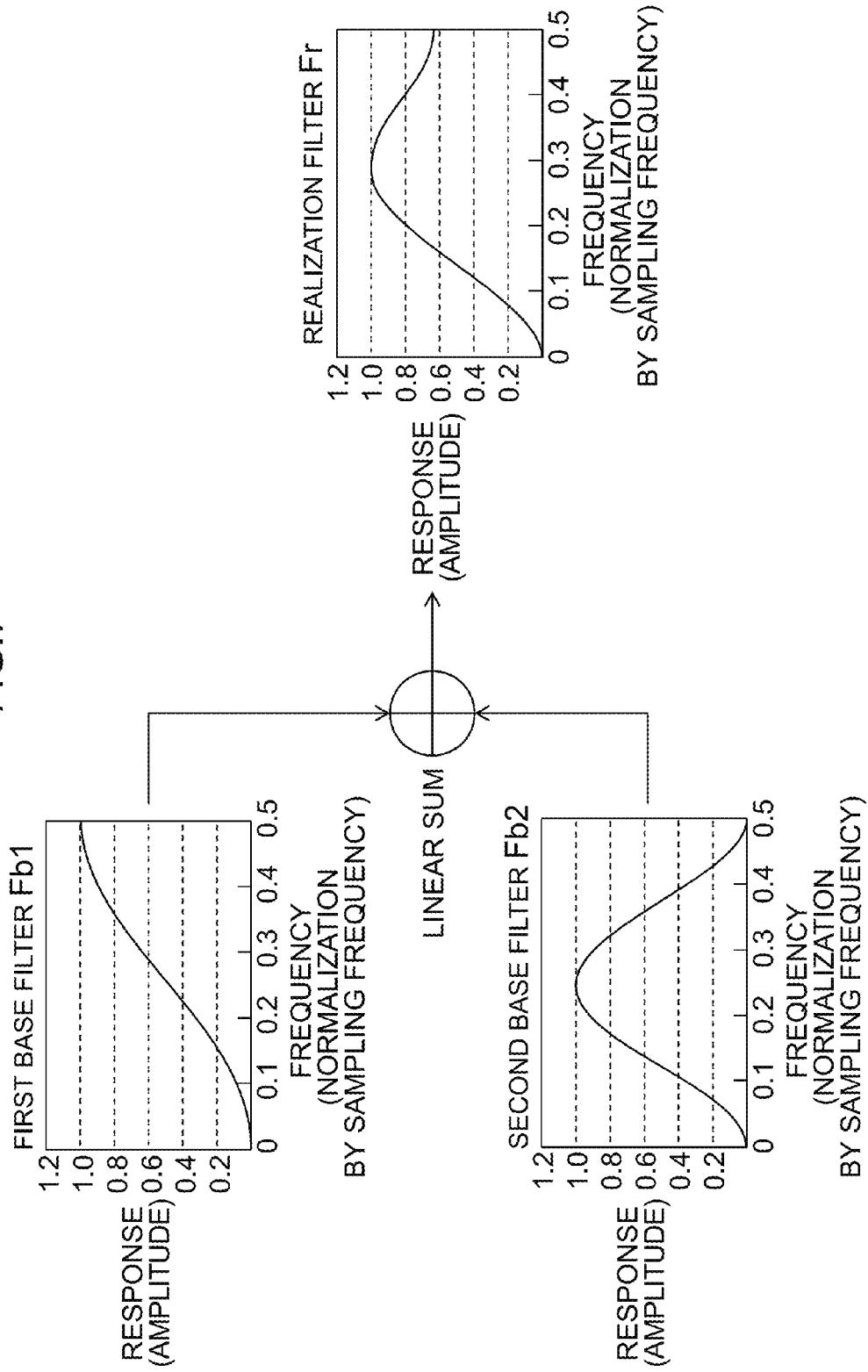
FIG. 7 is a conceptual diagram of a process to generate a restoration filter by the linear sum of multiple base filters.

A combination technique by the linear sum as illustrated in FIG. 7 is preferable as a combination technique of base filters Fb. FIG. 7 exemplifies a one-dimensional frequency characteristic for ease of understanding, and illustrates a case to generate realization filter Fr from the linear sum of two kinds of base filters (first base filter Fb1 and second base filter Fb2). The vertical axis of each filter illustrated in FIG. 7 shows the response (amplitude), the horizontal axis shows the frequency and the horizontal axis is based on a numerical value normalized by the sampling frequency. Here, the kind (number) of base filters Fb is not especially limited, and realization filter Fr may be generated from three or more kinds of base filters Fb.

The least-squares method can be suitably used as a technique of fitting to the ideal filter, the weighting coefficient with respect to each of multiple base filters to be combined can be calculated by the least-squares method based on ideal filter Fi, and fitting can be performed so as to minimize the frequency characteristic difference between ideal filter Fi and realization filter Fr.

For example, in a case where the response (amplitude) with respect to frequency f of the ideal filter is assumed as p(f), the response (amplitude) with respect to frequency f of each base filter is assumed as $g_i(f)$ (where "i" corresponds to the kind (number) of used base filters) and the response (amplitude) with respect to frequency f of the realization filter is assumed as g(f), it is possible to calculate weighting coefficient wi with respect to each of the used base filters so as to minimize integral value (evaluation value) J in a predetermined frequency band of the square value (|p(f)−g(f)|2) of the absolute value of the difference between p(f) and g(f) as shown by the following expression.

$$g(f)=\Sigma(w_i \times g_i(f))$$

$$\Sigma w_i = 1$$

$$J=\int |p(f)-g(f)|^2 df \to {}^M\text{Minimum(minimum value)} \quad [\text{Expression 2}]$$

Here, a technique of fitting to the ideal filter is not limited to the above-mentioned example, and, for example, weighting coefficient wi with respect to each of the base filters may be calculated so as to minimize above-mentioned evaluation value J in consideration of a visual characteristic. For example, based on the following expression, it is possible to calculate weighting coefficient wi with respect to each of the used base filters so as to minimize integral value J (evaluation value) in a predetermined frequency band of the square value ((v(f)·|(p(f)−g(f))|)2) of the product of "the absolute value of the difference between p(f) and g(f)" and "numerical value v(f) showing a visual characteristic".

$$J=\int (v(f) \cdot |(p(f)-g(f))|)^2 df \to {}^M\text{Minimum(minimum value)} \quad [\text{Expression 3}]$$

At this time, numerical value v(f) illustrating the visual characteristic can be arbitrarily set according to the composition pixel number (recording pixel number) of image data (original image data Do) of the point image restoration processing target. For example, since there is a case where the reproducibility of the image component on the high frequency side is not sufficient when the composition pixel number of the original image data is small, it may be possible to relatively reduce weighting coefficient wi with respect to "a base filter that emphasizes the image component on the high frequency side" among used base filters gi(f) and perform fitting processing with respect to the ideal filter without using such "a base filter that emphasizes the image component on the high frequency side". Thus, the restoration filter (realization filter Fr) having a filter coefficient corresponding to the pixel number of the original image data is calculated, and it becomes possible to perform point image restoration processing with excellent visibility.

Figure 8:
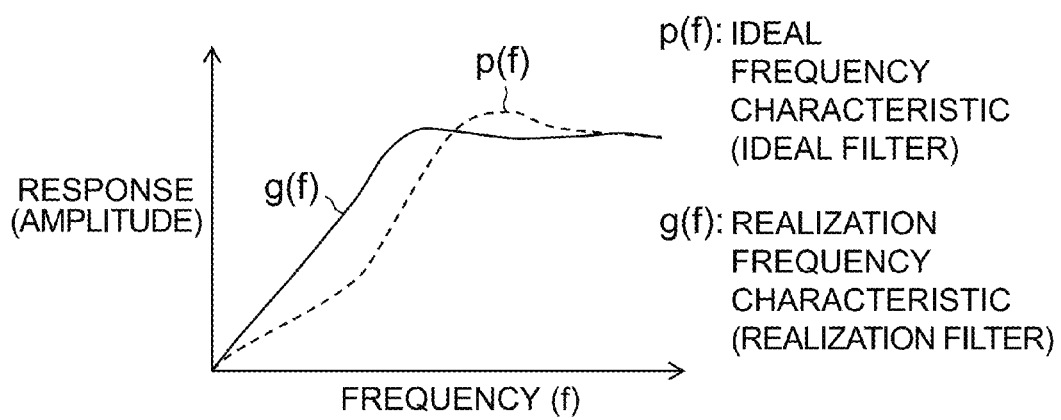
FIG. 8 is a graph illustrating one example of the "frequency-response (amplitude)" relationship between the ideal filter and the realization filter.

FIG. 8 is a graph illustrating one example of the "frequency-response (amplitude)" relationship between an ideal filter and a realization filter generated by combining multiple base filters so as to fit to this ideal filter. Here, FIG. 8 illustrates a one-dimensional frequency characteristic, where the vertical axis shows the response (amplitude) and the horizontal axis shows the frequency.

Figure 9:
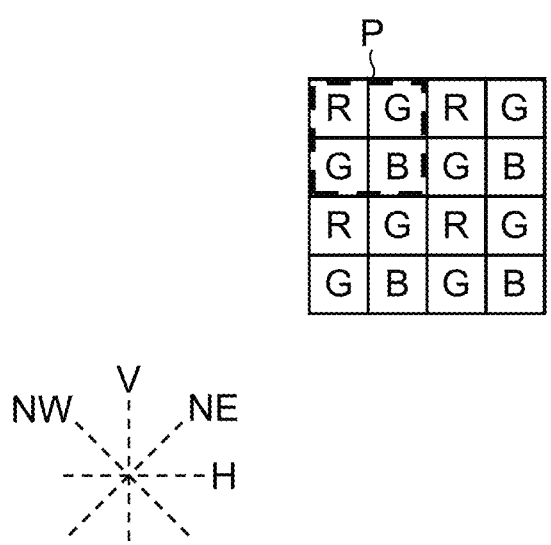
FIG. 9 is a plan view indicating one example of a color filter array of imaging elements (Bayer array).

FIG. 9 is a plan view illustrating one example of a color filter array of the imaging element 26 (Bayer array: Bayer), and FIG. 10 is a graph illustrating one example of realization filter Fr generated by combining multiple base filters and illustrates a two-dimensional frequency characteristic.

Figure 10:
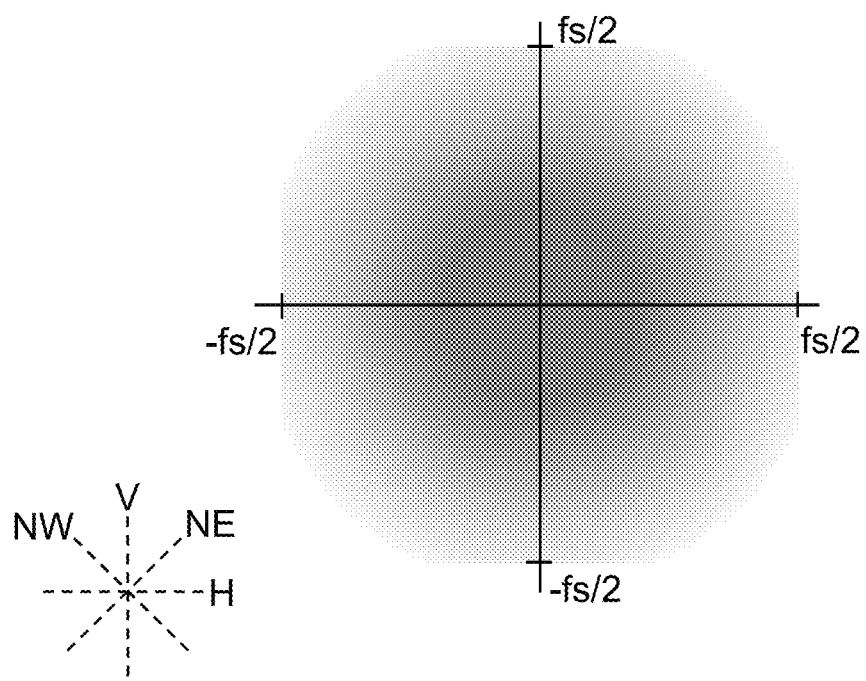
FIG. 10 is a graph illustrating one example of a realization filter generated by combining multiple base filters, and illustrates a two-dimensional frequency characteristic.

In FIG. 9 and FIG. 10, the direction (horizontal direction) expressed by "H" and the direction (vertical direction) expressed by "V" are in a mutually vertical relationship, and the direction expressed by "NE" and the direction expressed by "NW" form angles of 45 degrees with respect to the V direction and the H direction respectively and are in a mutually vertical relationship.

The Bayer array illustrated in FIG. 9 has an array of 2×2 pixels in horizontal direction H and vertical direction V as a basic unit (basic array pattern P), and basic array pattern P in which a row formed with an adjacent R (red) filter and G (green) filter and a row formed with an adjacent G filter and B (blue) filter are adjacently disposed in vertical direction V is repeatedly disposed in horizontal direction H and vertical direction V.

In the graph illustrated in FIG. 10, the axes extending in horizontal direction H and vertical direction V show the frequencies related to horizontal direction H and vertical direction V respectively, and "fs" shows the sampling frequency. A light and shade change in FIG. 10 shows "the response (amplitude) of a restoration filter", and the response is larger in a darker part and the response is smaller in a lighter part. Therefore, in the restoration filter illustrated in FIG. 10, the response is larger on the lower frequency side in horizontal direction H and vertical direction V, and the response is smaller on the higher frequency side.

Here, the restoration filter (realization filter Fr) illustrated in FIG. 10 is merely one example, and the restoration filter can be arbitrarily adjusted according to the characteristic of image data of the point image restoration processing target and the composition tap number of a restoration filter on the real space used at the time of point image restoration processing, and so on.

For example, in image data (mosaic image data or RAW data) taken and acquired by a single-plate imaging element like an imaging element including the Bayer array color filter of FIG. 9, each pixel does not have color information on all of RGB first and includes only color information on a corresponding color filter. Each pixel has color information on all of RGB by performing demosaic processing on this image data (RAW data). The demosaic processing is processing to calculate all color information on each pixel from a mosaic image corresponding to the color filter array of a single-plate color imaging element, and it is also called synchronization processing. For example, in the case of an imaging element formed with color filters of three colors of RGB, processing to calculate color information on all of RGB for each pixel from a mosaic image formed with RGB is demosaic processing. The demosaic processing can be implemented by various techniques, and the development accuracy (demosaic processing accuracy) of RAW data also varies according to a specific technique of the demosaic processing.

In general, there is a high possibility that spurious signals are caused in the oblique direction (see reference characters "NE" and "NW" in FIG. 9 and FIG. 10) in an image (demosaic image) obtained by this demosaic processing though it depends on the color filter array and the performance of the demosaic processing. Therefore, there is a concern of making such spurious signals remarkable in the demosaic image as a result when the image data of the oblique direction is emphasized by point image restoration processing. Then, when the point image restoration processing is performed, the weighting coefficient with respect to each base filter may be calculated such that the high-frequency component in the oblique direction (NE, NW) becomes small in the horizontal (H) and vertical (V) directions, and a restoration filter may be generated. Thus, by deciding the weighting with respect to each base filter such that the restoration filter has a desired frequency characteristic according to a color filter array, it is possible to make spurious signals unremarkable in a demosaic image.

Figure 11:
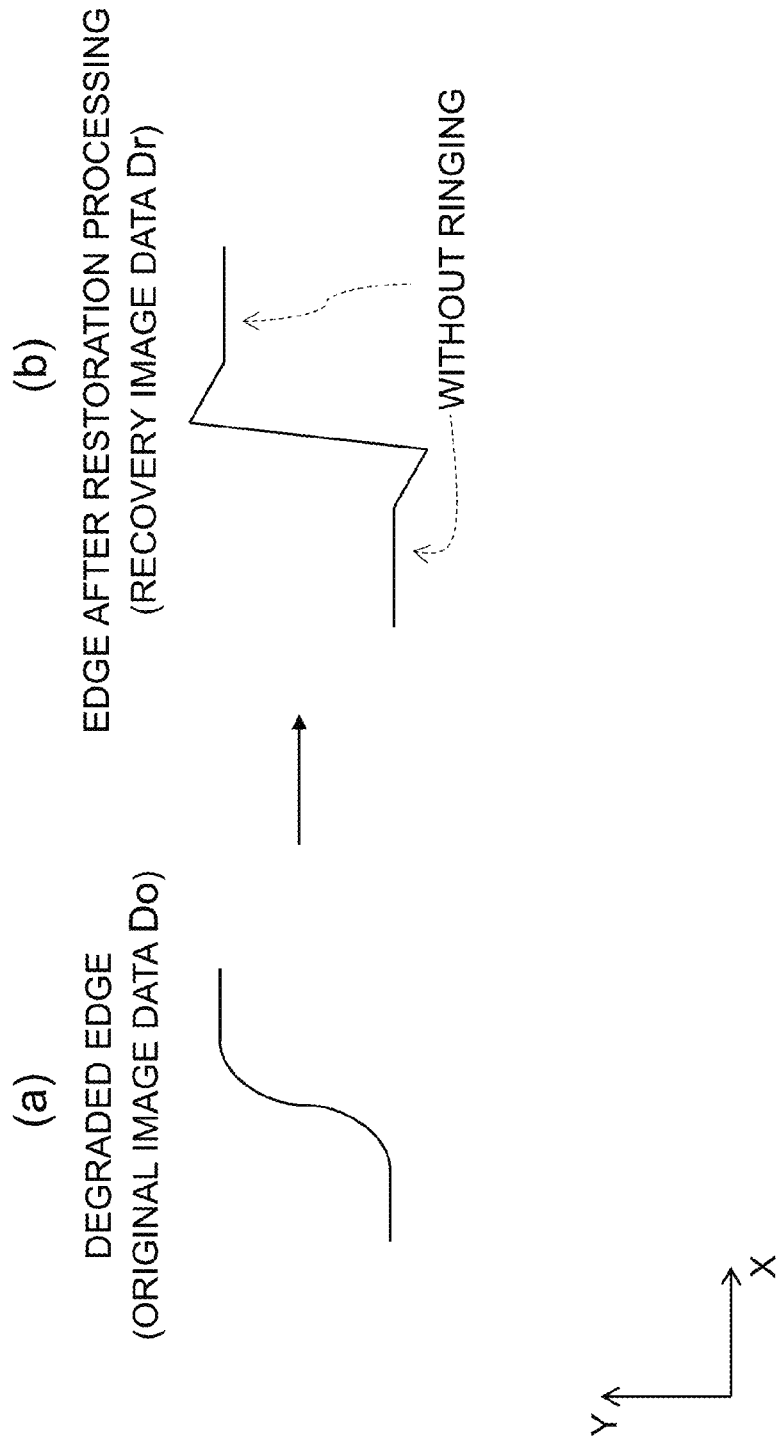
FIG. 11 is a diagram illustrating one example of an image quality change in the edge part in an object image before and after point image restoration processing using a restoration filter generated from a base filter that does not cause ringing.

FIG. 11 is a diagram illustrating one example of a contrast change of the edge part in an object image before and after point image restoration processing using a restoration filter generated by the linear sum of multiple base filters that do not cause ringing. (a) portion of FIG. 11 illustrates the contrast in original image data Do before the point image restoration processing and ((b) portion of FIG. 11 illustrates the contrast in recovery image data Dr after the point image restoration processing. Here, the horizontal direction (X direction) in FIG. 11 shows the position (one-dimensional position) in the object image and the vertical direction (Y direction) shows the degree of contrast.

As illustrated in FIG. 11, according to the point image restoration processing of this example, it is possible to effectively prevent the occurrence of ringing in recovery image data Dr after the point image restoration processing as compared with the point image restoration processing in the related art (see FIG. 5).

In the following, configuration examples of "filtering device" that generates the above-mentioned restoration filter and "point image restoration processing unit" that performs point image restoration processing using such a restoration filter are described.

Figure 12:
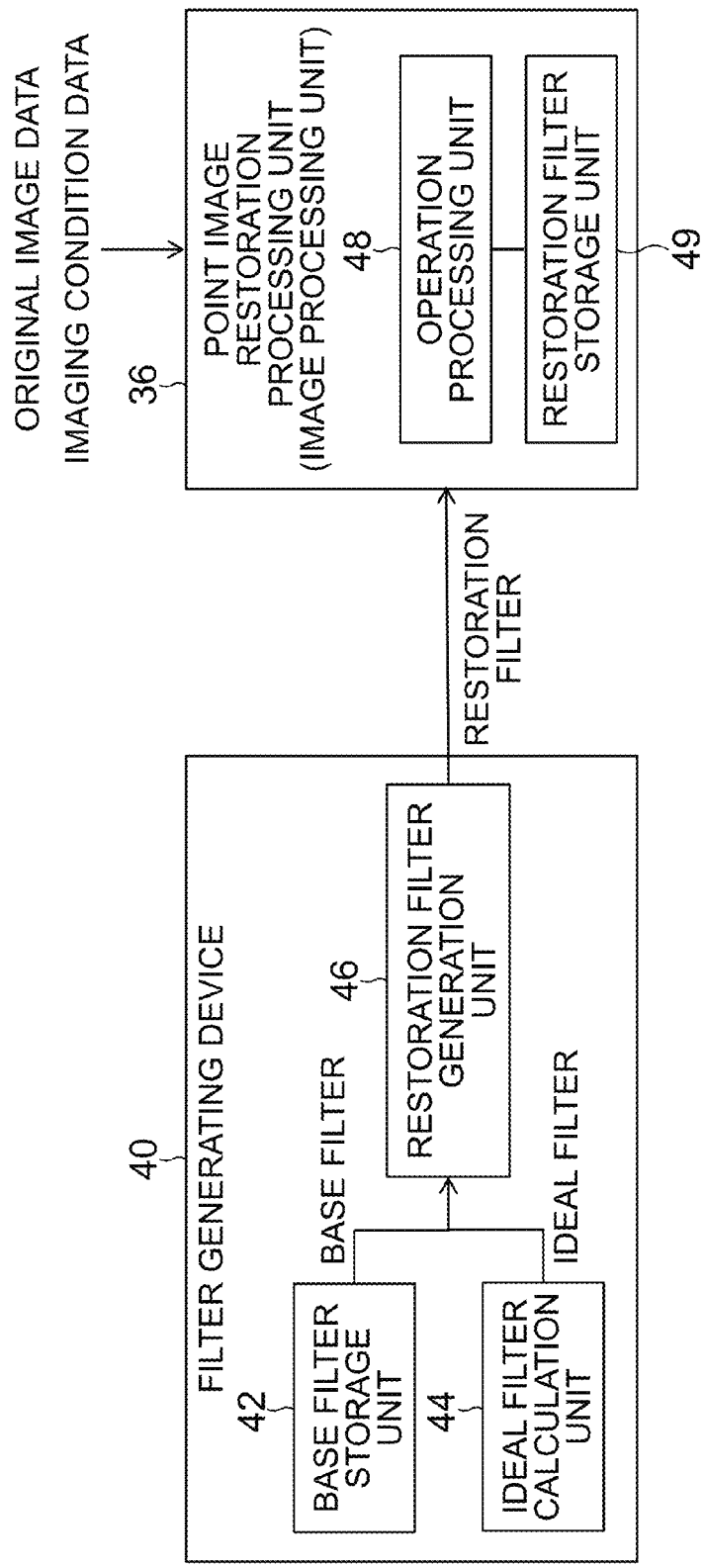
FIG. 12 is a block diagram illustrating a point image restoration processing unit and a filter generating device according to an embodiment of the present invention.

FIG. 12 is a block diagram illustrating the point image restoration processing unit and the filter generating device according to an embodiment of the present invention.

In the example illustrated in FIG. 12, the point image restoration processing unit 36 includes a restoration filter storage unit 49 that stores a restoration filter, and an operation processing unit 48 that calculates recovery image data from original image data by performing point image restoration processing using the restoration filter.

The restoration filter storage unit 49 stores the restoration filter generated by combining multiple base filters so as to fit to an ideal filter, and multiple restoration filters corresponding to imaging conditions are stored in the restoration filter storage unit 49. The imaging conditions here may include all factors that may influence the restoration filter, and, for example, may include arbitrary one of various conditions such as the kind of an optical system (the lens 16 and the diaphragm 17), the color filter array of the imaging element 26, the image formation pixel number, the pixel pitch diaphragm amount, the focal distance, the zoom amount and the image height.

An operation processing unit 48 selects and reads a restoration filter corresponding to imaging condition data related to original image data to be input, from the restoration filter storage unit 49, applies this read restoration filter to the original image data and performs point image restoration processing. That is, the operation processing unit 48 executes a step of acquiring the original image data obtained from the imaging element 26 by radiographing using an optical system, a step of reading the restoration filter based on a point spread function of the optical system and a step of performing restoration processing using the restoration filter on the original image data and obtaining recovery image data. Here, "imaging condition data related to original image data" can be input in the point image restoration processing unit 36 by an arbitrary technique. For example, the original image data to be input and the imaging condition data may be included in a single file. Moreover, in a case where at least part (for example, the kind of the optical system and a color filter array, and so on) of the imaging condition data is fixed like a digital camera of "lens-body all-in-one type", the point image restoration processing unit 36 stores and holds such fixed imaging condition data beforehand and arbitrarily reflects the fixed imaging condition data at the time of point image restoration processing in the operation processing unit 48.

Meanwhile, a filter generating device 40 includes a base filter storage unit (storage unit) 42, an ideal filter calculation unit 44 and the restoration filter generation unit 46.

The base filter storage unit 42 stores multiple base filters. The base filters stored in the base filter storage unit 42 are filters confirmed beforehand to be effective to prevent image quality degradation, and respective frequency characteristics are mutually different. For example, the base filter storage unit 42 may store a filter (filter for contour correction) having a frequency characteristic for contour correction as a base filter, and, as mentioned above, it may store "a filter that does not cause ringing in recovery image data Dr" and "a filter that does not emphasize return noise".

The ideal filter calculation unit 44 arbitrarily calculates an ideal filter corresponding to imaging conditions on the basis of the point spread function of the optical system. A calculation method of the ideal filter in the ideal filter calculation unit 44 is not especially limited, and, for example, it is also possible to design and calculate the ideal filter using a Wiener filter.

The restoration filter generation unit 46 is connected with the base filter storage unit 42 and the ideal filter calculation unit 44, and generates a restoration filter by combining multiple base filters stored in the base filter storage unit 42 so as to fit to the ideal filter generated in the base filter storage unit 42.

The restoration filter generated in the restoration filter generation unit 46 is sent from the filter generating device 40 to the point image restoration processing unit 36 and preserved in the restoration filter storage unit 49 of the point image restoration processing unit 36.

Here, the ideal filter calculation unit 44, the base filter storage unit 42 and the restoration filter generation unit 46 which form the filter generating device 40 may be installed in the same equipment or may be installed in different equipment.

Moreover, the filter generating device 40 may be installed in the same equipment (the digital camera 10) as that of the point image restoration processing unit 36, or may be installed in other equipment (the computer 60 and the server 80, and so on) connected with the digital camera 10. In a case where the point image restoration processing unit 36 and the filter generating device 40 are installed in different devices, when these different devices are mutually connected, the restoration filter generated in the restoration filter generation unit 46 of the filter generating device 40 is sent to the point image restoration processing unit 36 and preserved in the restoration filter storage unit 49. Here, the filter generating device 40 may include a storage unit that stores and preserves the restoration filter generated in the restoration filter generation unit 46 or may cause the restoration filter to be sent from this storage unit to the point image restoration processing unit 36.

Figure 13:
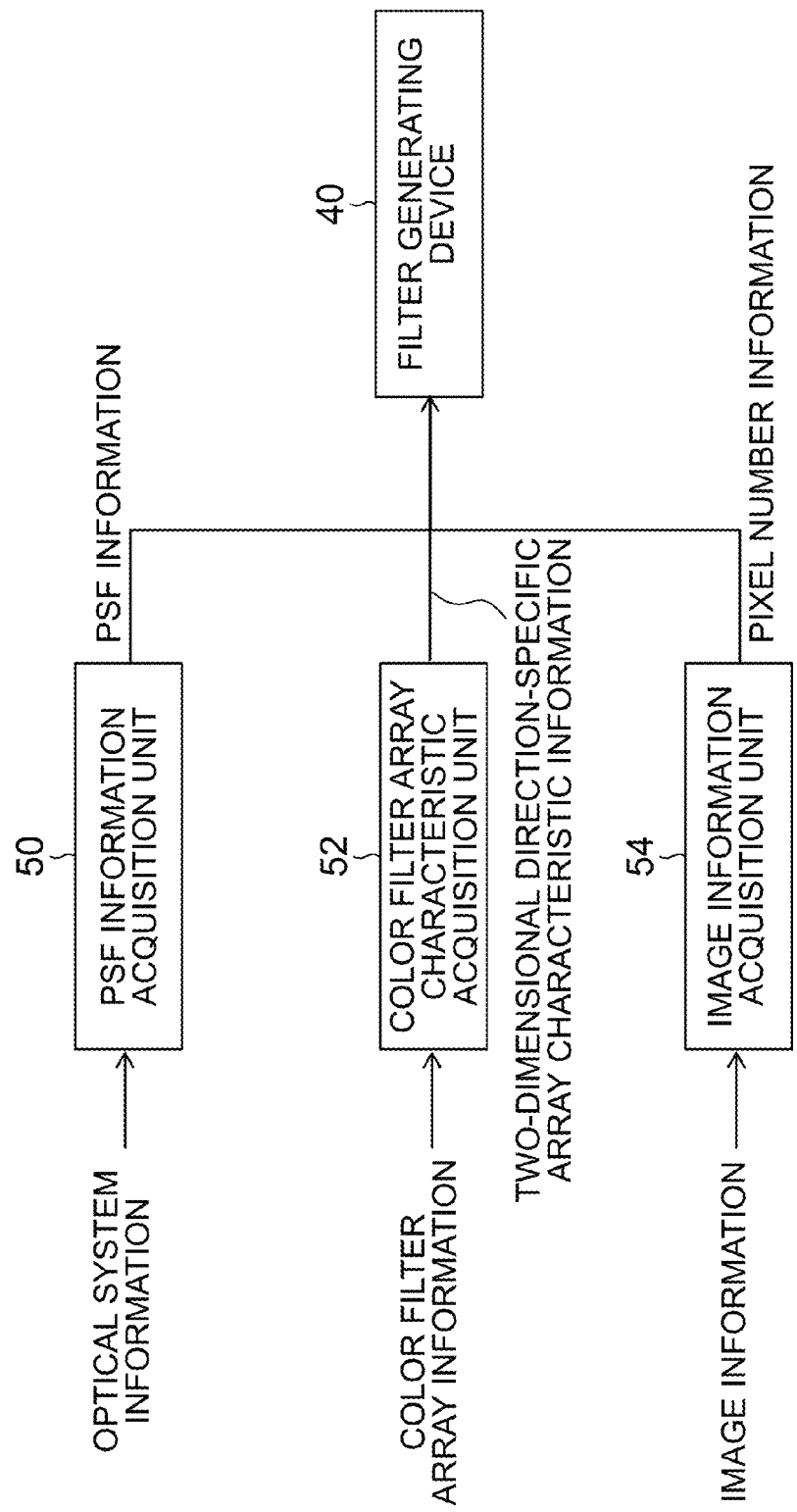
FIG. 13 is a diagram illustrating information supplied to a filter generating device.

FIG. 13 is a diagram illustrating an information supply block with respect to the filter generating device 40.

A PSF information acquisition unit 50, a color filter array characteristic acquisition unit 52 and an image information acquisition unit 54 are connected with the filter generating device 40.

The PSF information acquisition unit 50 acquires PSF information (point spread function) on an optical system on the basis of optical system information and transmits it to the filter generating device 40. The optical system information may be transmitted from an arbitrary part to the PSF information acquisition unit 50, and, for example, it may be transmitted from the lens unit 12 (the lens unit controller 20) or the like to the PSF information acquisition unit 50.

The color filter array characteristic acquisition unit 52 acquires two-dimensional direction-specific array characteristic information of each color filter array on the basis of color filter array information and transmits it to the filter generating device 40. The two-dimensional direction-specific array characteristic information is characteristic information on the two-dimensional direction (see reference characters H, V, NE and NW in FIG. 9) related to a corresponding color filter array, and, for example, may include information on the image reproducibility (demosaic processing accuracy, and so on) of each direction. The color filter array information may be transmitted from an arbitrary part to the color filter array characteristic acquisition unit 52, and, for example, it may be transmitted from the lens unit 12 (the lens unit controller 20) or the like to the PSF information acquisition unit 50.

The image information acquisition unit 54 transmits pixel number information showing the number of pixels forming an image to the filter generating device 40 on the basis of supplied image information. The image information may be transmitted from an arbitrary part to the image information acquisition unit 54, and, for example, it may be transmitted from the device control unit 34 (the camera body controller 28) or the like to the image information acquisition unit 54.

In the filter generating device 40, the calculation of an ideal filter in the ideal filter calculation unit 44 and the generation of a restoration filter in the restoration filter generation unit 46 are performed on the basis of these items of information. For example, by forming a restoration filter corresponding to the array characteristic of a color filter (color filter array information), point image restoration processing to improve a resolution feeling while suppressing spurious signals becomes possible.

Here, in a case where the above-mentioned optical system information, color filter array information and image information are fixed beforehand, they may be stored and held beforehand in the PSF information acquisition unit 50, the color filter array characteristic acquisition unit 52 and the image information acquisition unit 54.

As described above, according to the present embodiment, since point image restoration processing is performed using "a restoration filter generated by combining multiple base filters so as to fit to an ideal filter", it becomes possible to "prevent a bad influence on image quality excluding point image restoration accuracy" secured by a base filter while realizing "highly accurate point image restoration processing". Especially, by using a filter decided to have an excellent image processing characteristic as a base filter, it is possible to effectively prevent the failure of image data after the point image restoration processing.

Moreover, since the point image restoration processing according to the present embodiment can be realized by a simple technique, it can be easily adopted even in equipment such as a mobile device in which the tap number of an available restoration filter and a processing circuit are restricted, and it can be flexibly applied to various kinds of equipment.

Modification Example 1

In this modification example, explanation is omitted for components and operation similar to the above-mentioned embodiment.

An example of performing point image restoration processing on all original image data by the use of "a restoration filter (which is also called a "combination filter") generated by combining multiple base filters so as to fit to an ideal filter" has been described in the above-mentioned embodiment, but the combination filter does not have to be necessarily applied to all original image data.

Figure 14:
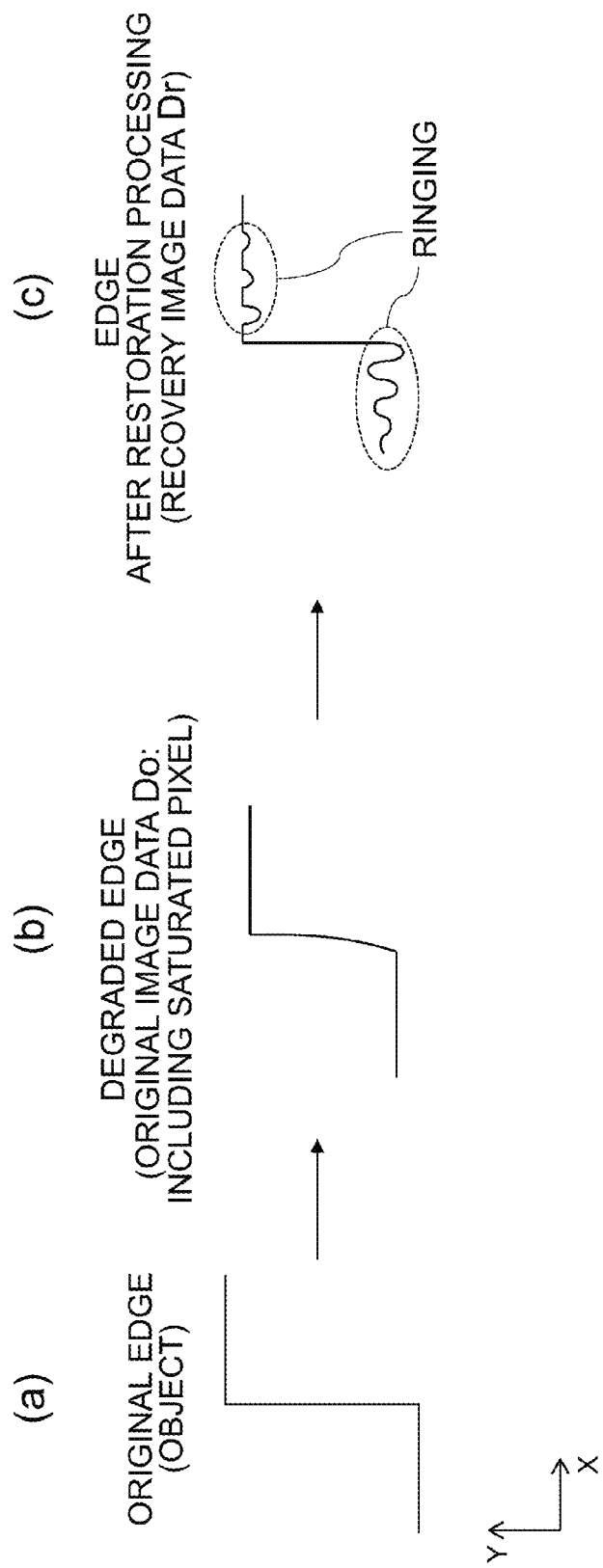
FIG. 14 is a diagram illustrating one example of an image quality change in the edge part (image boundary part) in an object image, and particularly illustrates an image quality change example of clipped image data with a saturated pixel value.

FIG. 14 is a diagram illustrating one example of an image quality change of the edge part (image boundary part) in an object image, and particularly illustrates an image quality change example of image data clipped with a saturated pixel value. (a) portion of FIG. 14 illustrates the contrast which the object image originally has, (b) portion of FIG. 14 illustrates the contrast in original image data Do before point image restoration processing, and (c) portion of FIG. 14 illustrates the contrast in recovery image data Dr after the point image restoration processing. Here, the horizontal direction (X direction) in FIG. 14 shows the position (one-dimensional position) in the object image and the vertical direction (Y direction) shows the degree of contrast.

As mentioned above, an image blur is caused (see (b) portion of FIG. 14) in a taken image (original image data Do) by the point spread phenomenon of an optical system at the time of radiographing in "the edge part with a difference in the contrast" in the object image (see (a) portion of FIG. 14), and recovery image data Dr is obtained by point image restoration processing (see (c) portion of FIG. 14).

In this point image restoration processing, an image is appropriately restored in a case where "an actual image degradation characteristic (image blur characteristic)" and "information (PSF, and so on) based on a used point spread function" are matched, and it is possible to obtain recovery image data Dr in which the edge part or the like is appropriately restored.

However, original image data including a pixel (saturation pixel) with a saturated pixel value is in a state in which it is clipped in the saturation pixel part. Especially, since the original image data of the edge part including the saturation pixel has a waveform close to a step signal (see (b) portion of FIG. 14), a contrast change is relatively clear, and it becomes data with relatively small degradation (image blur) as a result. Thus, in the original image data including the saturation pixel, a gap from essential image data showing the object image is caused by clipping of pixel data. When restoration processing using a normal restoration filter (see "ideal filter Fi" in FIG. 6) is performed on the original image data with such a data gap, ringing is likely to occur and ringing to be generated is likely to become complicated (see (c) portion of FIG. 14). Moreover, the high-frequency component increases, and return noise is likely to be emphasized.

Therefore, a restoration filter used in restoration processing may be switched between "image data including the saturation pixel (or image data in which there is a high possibility of including the saturation pixel)" and "image data excluding the saturation pixel (or image data in which there is not a high possibility of including the saturation pixel)".

Figure 15:
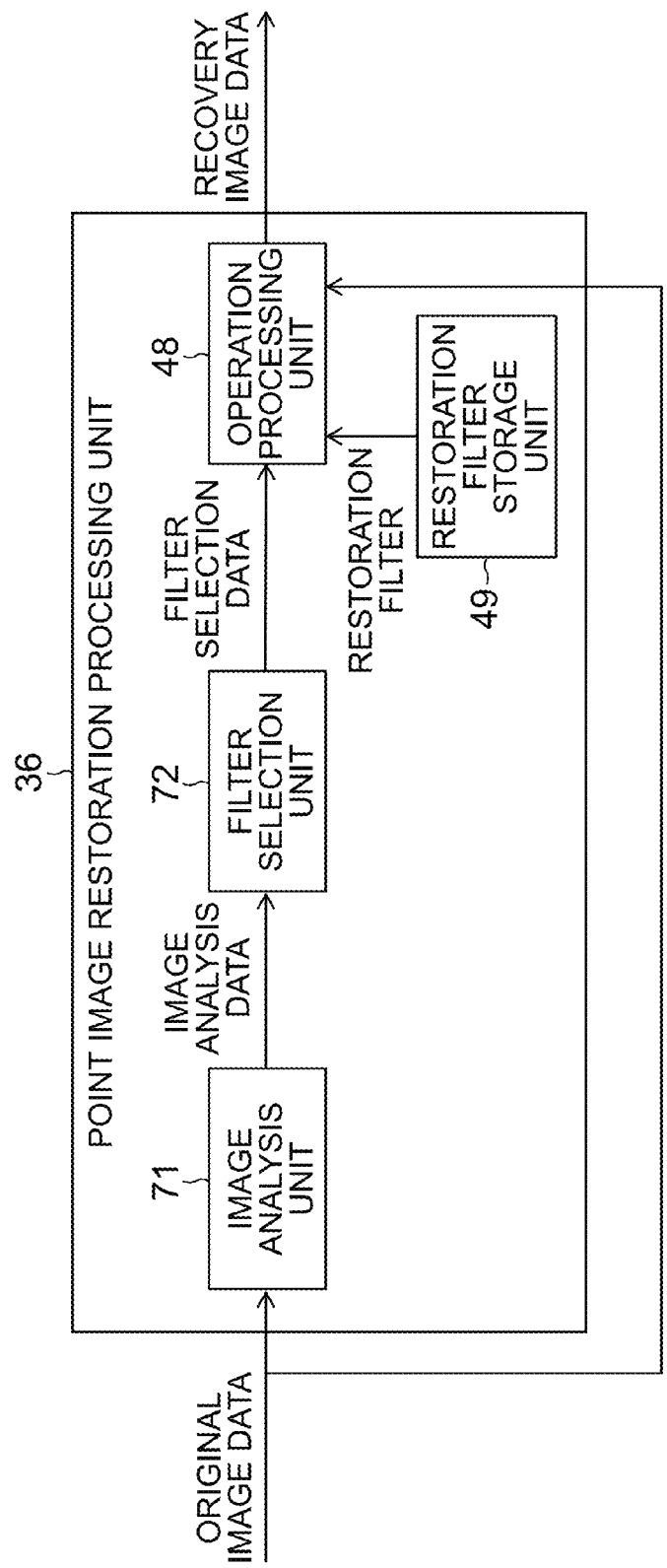
FIG. 15 is a block diagram illustrating one example of a point image restoration processing unit.

FIG. 15 is a block diagram illustrating one example of the point image restoration processing unit 36 and illustrates an example of switching a restoration filter according to data as to the presence of a saturation pixel (image analysis data).

The point image restoration processing unit 36 of this example includes an image analysis unit 71, a filter selection unit 72, an operation processing unit (restoration operation unit) 48 and a restoration filter storage unit 49.

The image analysis unit 71 functions as an image information acquisition unit that analyzes original image data obtained from the imaging element 26 by radiographing using an optical system (the lens 16 and the diaphragm 17, and so on) and acquires image analysis data (image information).

The image analysis data of this example is data showing whether pixel data having a saturated pixel value or pixel data having a pixel value larger than a threshold is included in the original image data. The pixel data with the saturated pixel value (saturation pixel data) here is pixel data showing the maximum value of the pixel value that can be expressed by a unit pixel, and, for example, in a case where pixel data of the unit pixel can be expressed by 8 bits of pixel values "0 to 255", a pixel value of "255" becomes saturation pixel data, and the pixel having such saturation pixel data is called "saturation pixel". Moreover, "a pixel value larger than a threshold" is a relatively large pixel value close to the saturation pixel data, and, for example, it is possible to define "threshold" as 90% of the saturation pixel data and assume a pixel value larger than 90% of the saturation pixel data as "a pixel value larger than a threshold". Here, "threshold" is not especially limited, but "threshold" may be arbitrarily set by restoration processing using an actual restoration filter (ideal filter) on the basis of the degree of the pixel value that may influence image degradation such as the occurrence of ringing and the emphasis of return signals.

The filter selection unit 72 selects a restoration filter based on the point spread function of the optical system on the basis of the image analysis data (image information) from the image analysis unit 71.

Restoration filters that can be selected in this example are an ideal filter (see "ideal filter Fi" in FIG. 6) based on the point spread function of the optical system and a combination filter (see "realization filter Fr" in FIG. 6) generated by combining multiple base filters so as to fit to this ideal filter, and they are stored in the restoration filter storage unit 49. Here, similar to the above-mentioned embodiment, the combination filter can "be generated by combining multiple base filters that do not cause ringing in recovery image data obtained in a case where restoration processing using each of them alone is performed on the original image data" and "be generated by combining multiple base filters that do not emphasize return noise in the recovery image data obtained in a case where the restoration processing using each of them alone is performed on the original image data".

Therefore, the filter selection unit 72 selects any one of the ideal filter and the combination filter as a restoration filter used for restoration processing on the basis of the image analysis data (image information). To be more specific, in a case where the image analysis data shows that "saturation pixel data or pixel data having a pixel value larger than a threshold is included in the original image data", the filter selection unit 72 selects the combination filter. On the other hand, in a case where the image analysis data does not show that "saturation pixel data or pixel data having a pixel value larger than a threshold is included in the original image data", the ideal filter is selected.

Information on the restoration filter selected by the filter selection unit 72 in this way is sent to the operation processing unit 48 as filter selection data. Here, the filter selection unit 72 of this example selects any one of the ideal filter and the combination filter as a restoration filter used for restoration processing, for each original image data. Therefore, the ideal filter is applied to the whole of pixel data forming the original image data in a case where the ideal filter is selected in the filter selection unit 72, while the combination filter is applied to the whole of pixel data forming the original image data in a case where the combination filter is selected in the filter selection unit 72.

The operation processing unit 48 performs restoration processing using the restoration filter selected by the filter selection unit 72 on the original image data, and acquires and outputs recovery image data.

That is, the operation processing unit 48 refers to the filter selection data and reads the restoration filter selected by the filter selection unit 72 out of "the ideal filter and the combination filter" stored in the restoration filter storage unit 49. Further, the operation processing unit 48 applies this read restoration filter to the original image data and performs point image restoration processing. Here, a respect that the operation processing unit 48 selects and reads the restoration filter corresponding to imaging condition data related to the input original image data from the restoration filter storage unit 49, is similar to the above-mentioned embodiment (see FIG. 12).

As described above, according to this example, restoration processing using the combination filter is performed on "original image data including saturation pixel data or pixel data having a pixel value larger than a threshold" in which ringing or the emphasis of return noise is likely to be caused by restoration processing, and it is possible to effectively prevent image quality degradation such as the occurrence of ringing and the emphasis of return noise. On the other hand, restoration processing using the ideal filter is performed on "original image data excluding pixel data with a saturated pixel value or pixel data having a pixel value larger than the threshold" in which image quality degradation such as the occurrence of ringing and the emphasis of return noise by restoration processing is less likely to be caused, and it is possible to acquire recovery image data having excellent reproducibility.

Modification Example 2

In this modification example, explanation is omitted for components and operation similar to above-mentioned modification example 1.

An example of selecting an optimal restoration filter from an ideal filter and a combination filter on the basis of image analysis data (image information) and applying the selected restoration filter for each original image data has been described in above-mentioned modification example 1, but the selected restoration filter may be applied for each pixel data.

Figure 16:
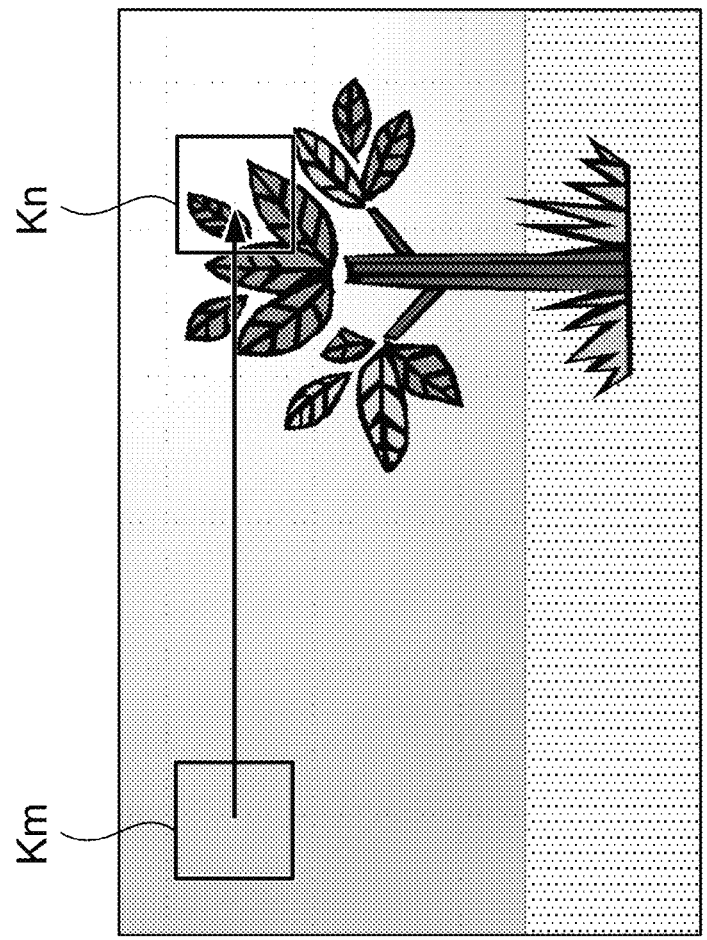
FIG. 16 is a diagram illustrating an image example to describe an example of selecting a restoration filter every pixel data.

FIG. 16 is a diagram illustrating an image example to describe an example of selecting the restoration filter for each pixel data, and illustrates an example of selecting and deciding a restoration filter on the basis of image analysis data (image information) of a noted pixel and peripheral pixels thereof in a kernel (Km, Kn).

Even in this example, the image analysis unit 71 (see FIG. 15) analyzes original image data and acquires image analysis data (image information) showing whether saturation pixel data or pixel data having a pixel value larger than a threshold is included in the original image data.

The filter selection unit 72 selects a restoration filter on the basis of the image analysis data sent from the image analysis unit 71, but it selects the restoration filter in pixel units of the original image data. That is, the filter selection unit 72 selects any one of the ideal filter and the combination filter for each pixel data forming the original image data, as a restoration filter used for restoration processing with respect to a noted pixel, on the basis of the image analysis data (image information) related to the noted pixel and the peripheral pixels of this noted pixel in the original image data.

In this example, it is determined in the filter selection unit 72 that at least part of pixel data of the noted pixel, which is disposed in the center of a kernel of a predetermined size (for example, a kernel of about 9 (X direction)×9 (Y direction) pixels (see "Km" and "Kn" in FIG. 12)), and the peripheral pixels, which are disposed in the periphery thereof, is pixel data (saturation pixel data) with a saturated pixel value or pixel data having a pixel value larger than a threshold.

Here, the size of the kernel is not especially limited, but it is desirable to be defined on the basis of the size (see "N taps" and "M taps" of "real space filter" in FIG. 4) of a restoration filter on the real space, which is used for point image restoration processing, and it is desirable to set the kernel size so as to be equal to or less than the size of the restoration filter on the real space.

In a case where it is determined that "saturation pixel data or pixel data having a pixel value larger than a threshold" is included in pixel data of a pixel in the kernel (see "Kn" in FIG. 12), the filter selection unit 72 selects the combination filter as a restoration filter used for restoration processing of the noted pixel. On the other hand, in a case where it is determined that "saturation pixel data or pixel data having a pixel value larger than a threshold" is not included in the pixel data of the pixel in the kernel (see "Km" in FIG. 12), the filter selection unit 72 selects the ideal filter as the restoration filter used for the restoration processing of the noted pixel.

Information on the restoration filter selected by the filter selection unit 72 in this way is sent to the operation processing unit 48 as filter selection data.

The operation processing unit 48 performs restoration processing using the restoration filter selected by the filter selection unit 72 on the original image data, and acquires and outputs recovery image data.

That is, the operation processing unit 48 refers to the filter selection data and reads the restoration filter selected by the filter selection unit 72 out of "the ideal filter and the combination filter" stored in the restoration filter storage unit 49, for each pixel data. Further, the operation processing unit 48 applies this read restoration filter to a noted pixel of the restoration processing target of the original image data and performs point image restoration processing on the noted pixel (pixel data). The operation processing unit 48 performs the point image restoration processing of each pixel (each pixel data) while changing the noted pixel in the pixels of the original image data.

As described above, according to this example, since it is possible to perform restoration processing while switching "a filter in which image quality degradation such as the occurrence of ringing and the emphasis of return noise is less likely to be caused (combination filter)" and "a filter having excellent restoration reproducibility (ideal filter)" in pixel units, image quality improvement in pixel units is possible. That is, the combination filter that suppresses the failure of a restoration image is used in restoration processing using pixel data of "saturation pixel" in which the occurrence of ringing and the emphasis of return noise or the like are likely to be caused by the restoration processing, and the ideal filter that can achieve more positive reproducibility is used in restoration processing not using the pixel data of such "saturation pixel".

Here, according to this modification example, "a pixel subjected to the restoration processing by the combination filter" and "a pixel subjected to the restoration processing by the ideal filter" exist together in one recovery image (recovery image data). By experiments, the present inventors confirmed that, even in such a recovery image in which pixels with different kinds of restoration filters exist together, the restoration reproducibility between both pixels is sufficiently balanced on user's sight and excellent image quality is maintained in the entire image.

Modification Example 3

In this modification example, explanation is omitted for components and operation similar to above-mentioned modification example 1 and modification example 2.

Figure 17:
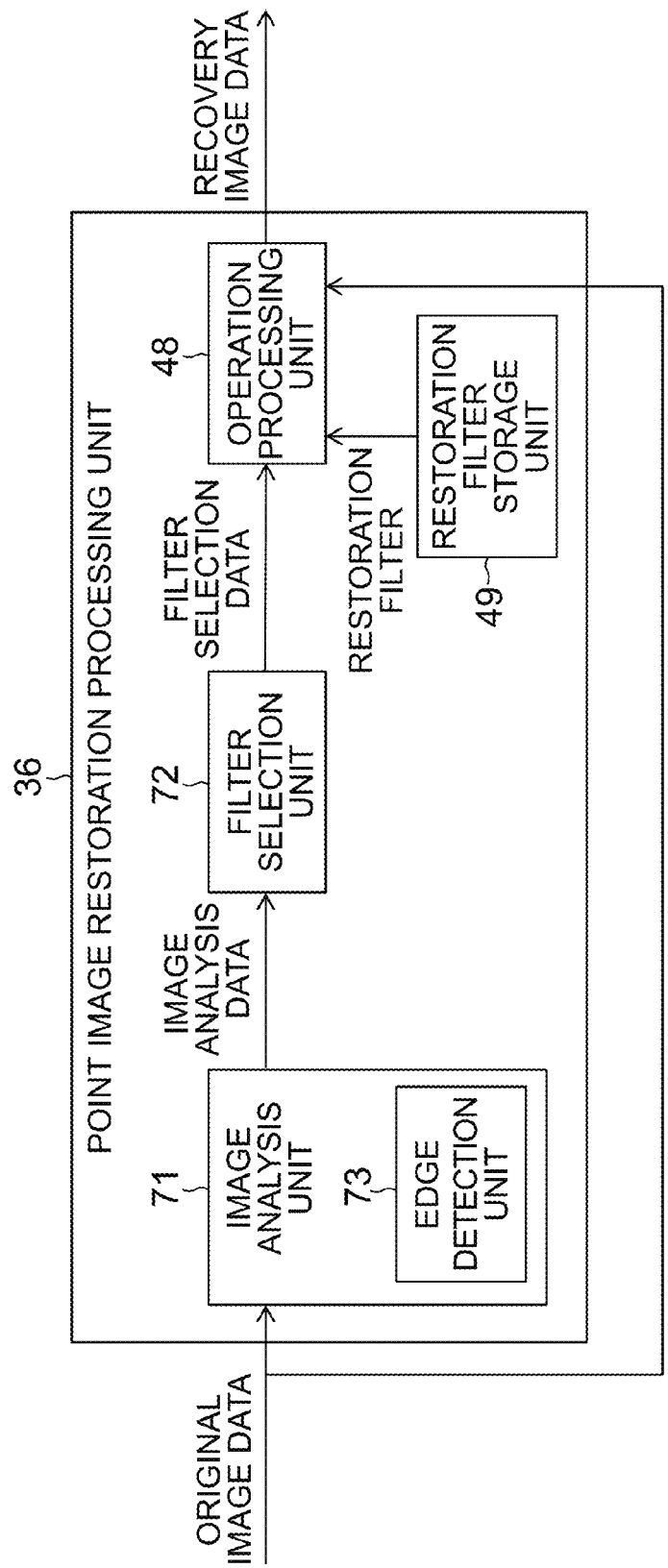
FIG. 17 is a block diagram illustrating another example of the point image restoration processing unit.

FIG. 17 is a block diagram illustrating another example of the point image restoration processing unit 36, and illustrates an example of switching a restoration filter according to the presence of a saturation pixel and data of the edge part (image analysis data).

In this example, the restoration filter is switched on the basis of whether saturation pixel data or pixel data having a pixel value larger than a threshold is included in the edge part (image boundary part) of original image data.

The image analysis unit 71 includes an edge detection unit 73 that detects the edge part in the image of the original image data, and sends image analysis data showing whether pixel data with a saturated pixel value (saturation pixel data) or pixel data having a pixel value larger than the threshold is included in the edge part of the original image data, to the filter selection unit 72.

The image analysis data is not especially limited as long as it directly or indirectly shows whether the saturation pixel data or the pixel data having a pixel value larger than the threshold is included in the edge part of the original image data, and, for example, it is also possible to form the image analysis data with data that associates "each pixel and pixel data (pixel value)" and data that associates "each pixel and the edge part".

Here, the range of "edge part" is not especially limited, and a part with a large contrast difference in a predetermined range can be detected as the edge part.

Moreover, an example of installing the edge detection unit 73 in the image analysis unit 71 (the point image restoration processing unit 36) is described in this example, but data of "the edge part in the image of the original image data" additionally detected may be used. For example, contour data (edge data) used for contour correction processing in the image processing unit 35 (see FIG. 2) may be sent to the image analysis unit 71 (the point image restoration processing unit 36), and the image analysis data sent to the filter selection unit 72 may be formed on the basis of the contour data (edge data).

The filter selection unit 72 selects a restoration filter used for restoration processing on the basis of the image analysis data (image information). That is, in a case where the pixel analysis data shows that the saturation pixel data or the pixel data having a pixel value larger than the threshold is included in the edge part of the original image data, the filter selection unit 72 selects the combination filter. On the other hand, in a case where the pixel analysis data does not show that the saturation pixel data or the pixel data having a pixel value larger than the threshold is included in the edge part of the original image data, the ideal filter is selected.

Here, the selection of the restoration filter in the filter selection unit 72 may be performed for each original image data (see modification example 1) or may be performed for each pixel forming the original image data (see modification example 2).

Therefore, the operation processing unit 48 performs restoration processing using the restoration filter selected by the filter selection unit 72 for each original image data or each pixel forming the original image data, and acquires and outputs recovery image data.

As described above, according to this example, it is possible to perform restoration processing by switching a restoration filter according to whether saturation pixel data or pixel data having a pixel value larger than a threshold is included in the edge part of the original image data. As mentioned above, image degradation such as the occurrence of ringing and the emphasis of return noise is likely to be caused in "restoration processing in the edge part" and "restoration processing using saturation pixel data or pixel data of a large value close to the saturation pixel data". Therefore, in a case where "a pixel having saturation pixel data or pixel data of a large value close to the saturation pixel data" exists in "the edge part" like this example, it is possible to effectively prevent image degradation by performing restoration processing using a combination filter.

Modification Example 4

In this modification example, explanation is omitted for components and operation similar to above-mentioned modification examples 1 to 3.

Figure 18:
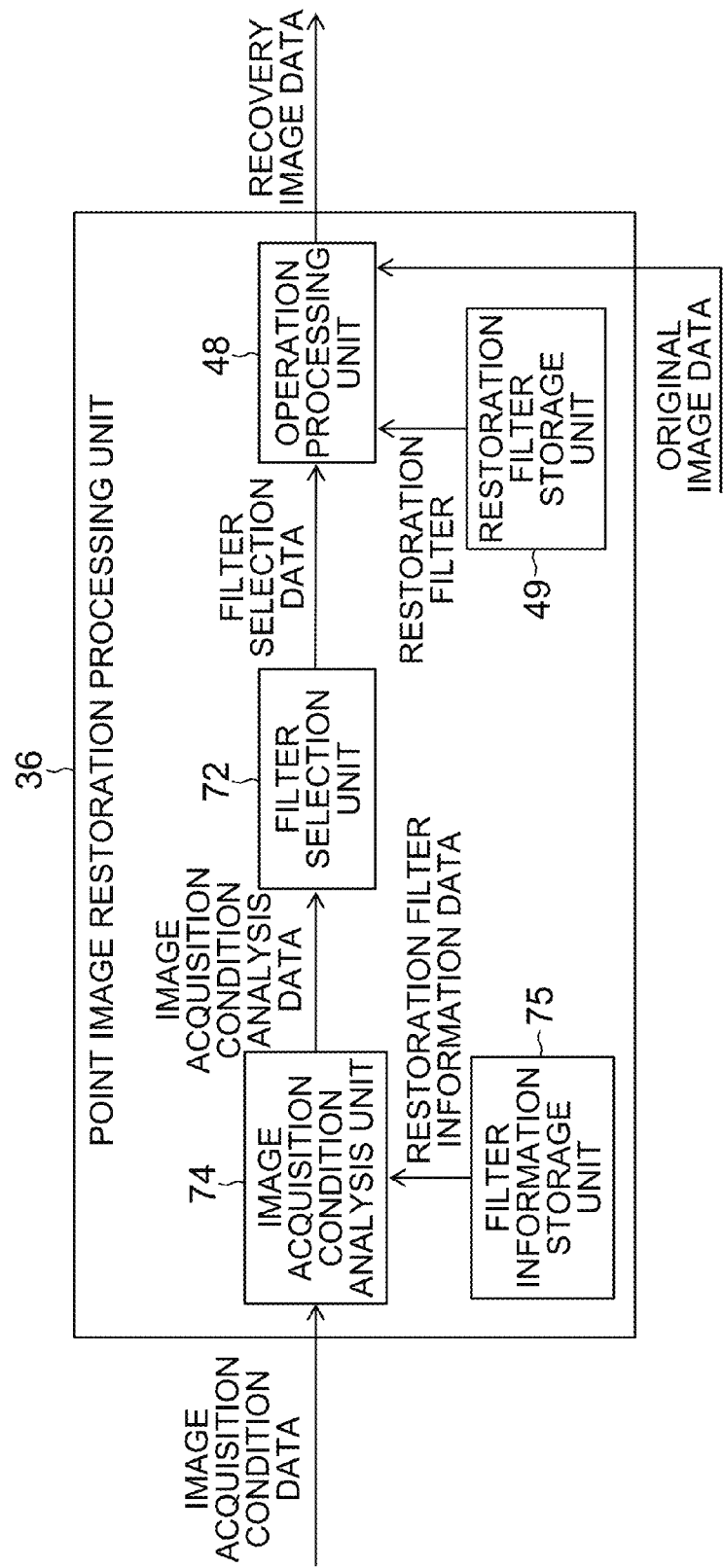
FIG. 18 is a block diagram illustrating another example of the point image restoration processing unit.

FIG. 18 is a block diagram illustrating another example of the point image restoration processing unit 36, and illustrates an example of switching a restoration filter according to image acquisition conditions.

In the point image restoration processing unit 36 of this example, an image acquisition condition analysis unit 74 and a filter information storage unit 75 are installed instead of the image analysis unit 71 (see FIG. 15 and FIG. 17).

The filter information storage unit 75 stores restoration filter information data including information on an optical system to which the restoration filter (especially, ideal filter) stored in the restoration filter storage unit 49 can correspond.

The image acquisition condition analysis unit 74 acquires image information including image acquisition condition data showing information on an optical system (the lens 16 and the diaphragm 17, and so on) used for the imaging acquisition of original image data. The image acquisition condition data can be acquired by an arbitrary method, and, for example, in a case where the target imaging acquisition condition data is associated with the original image data like the Exif format, required imaging acquisition condition data may be acquired from such associated data. Moreover, the required imaging acquisition condition data may be acquired from other units that store and hold the imaging acquisition condition data, separately from the original image data.

Further, the image acquisition condition analysis unit 74 reads the restoration filter information data stored in the filter information storage unit 75 and determines whether the acquired image acquisition condition data corresponds to the read restoration filter information data.

That is, the image acquisition condition analysis unit 74 determines whether the ideal filter stored in the restoration filter storage unit 49 corresponds to an optical system used for the imaging acquisition of the original image data, on the basis of the image acquisition condition data and the restoration filter information data. For example, it may be determined whether the lens 16 used for the imaging acquisition of the original image data corresponds to a lens which is the target of the ideal filter stored in the restoration filter storage unit 49. Moreover, it may be determined whether the F value used for the imaging acquisition of the original image data corresponds to the F value which is the target of the ideal filter stored in the restoration filter storage unit 49.

This determination result is sent from the filter selection unit 72 to the filter selection unit 72 as image acquisition condition analysis data.

The filter selection unit 72 selects a restoration filter on the basis of the image acquisition condition analysis data from the image acquisition condition analysis unit 74. For example, in a case where it is determined from the image acquisition condition analysis data that the ideal filter stored in the restoration filter storage unit 49 corresponds to the optical system used for imaging acquisition, the filter selection unit 72 selects the ideal filter as a restoration filter. On the other hand, in a case where it is determined that the ideal filter stored in the restoration filter storage unit 49 does not correspond to the optical system used for imaging acquisition, the filter selection unit 72 selects the combination filter as a restoration filter.

The selection result of the restoration filter in the filter selection unit 72 is sent to the operation processing unit 48 as filter selection data.

Here, the selection of the restoration filter in the filter selection unit 72 may be performed for each original image data (see modification example 1) or may be performed for each pixel forming the original image data (see modification example 2).

The operation processing unit 48 performs restoration processing using the restoration filter selected by the filter selection unit 72, for each original image data or each pixel forming the original image data, and acquires and outputs recovery image data.

As described above, according to this example, it is possible to perform restoration processing while switching a restoration filter according to image acquisition conditions such as the lens type and the diaphragm value (F value). For example, there is a possibility that original image data imaged and acquired on different conditions from image acquisition conditions assumed to be available by the ideal filter causes unexpected image degradation such as the occurrence of ringing and the emphasis of return noise by restoration processing with the ideal filter. However, according to this example, since restoration processing using the combination filter is performed in a case where the ideal filter does not correspond to image acquisition conditions, it is possible to effectively suppress unexpected image degradation such as the occurrence of ringing and the emphasis of return noise.

Modification Example 5

In this modification example, explanation is omitted for components and operation similar to above-mentioned modification examples 1 to 4.

An example of installing any one of the image analysis unit 71 and the image acquisition condition analysis unit 74 has been described in above-mentioned modification examples 1 to 4, but both of the image analysis unit 71 and the image acquisition condition analysis unit 74 may be installed.

That is, the image analysis unit 71 (see FIG. 15 and FIG. 17), the image acquisition condition analysis unit 74 and the filter information storage unit 75 (see FIG. 18) may be installed in the point image restoration processing unit 36, and image analysis data and image acquisition condition analysis data may be sent to the filter selection unit 72.

In this case, the filter selection unit 72 selects a restoration filter used for restoration processing on the basis of both of the image analysis data and the image acquisition condition analysis data. For example, the combination filter may be selected as a restoration filter "in a case where the ideal filter stored in the restoration filter storage unit 49 corresponds to a target lens and a saturation pixel is included in an image (edge part, and so on)", and the combination filter may be selected as a restoration filter even in a case where the saturation pixel is not included in the image (edge part, and so on) "in a case where the ideal filter stored in the restoration filter storage unit 49 does not correspond to the target lens".

The operation processing unit 48 performs restoration processing using the restoration filter selected by the filter selection unit 72, for each original image data or each pixel forming the original image data, and acquires and outputs recovery image data.

Other Modification Examples

The timing at which the above-mentioned point image restoration processing is performed is not especially limited.

Figure 19:
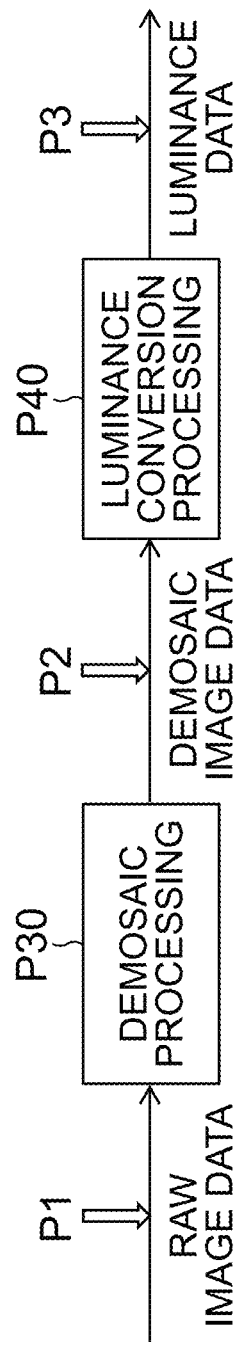
FIG. 19 is a diagram illustrating an image processing stage in which point image restoration processing can be performed.

Various kinds of image processing are performed in the image processing unit 35, and, for example, demosaic image data is generated from RAW image data by demosaic processing P30 like as illustrated in FIG. 19 and luminance data (for example, the "Y" signal of "YCbCr signals") is generated from the demosaic image data by luminance conversion processing P40. In such a series of image processing, point image restoration processing may be performed on any of "RAW image data before demosaic processing P30 (stage P1)", "demosaic image data after demosaic processing P30 and before luminance conversion processing P40 (stage P2)" and "luminance data after luminance conversion processing P40 (stage P)".

Figure 20:
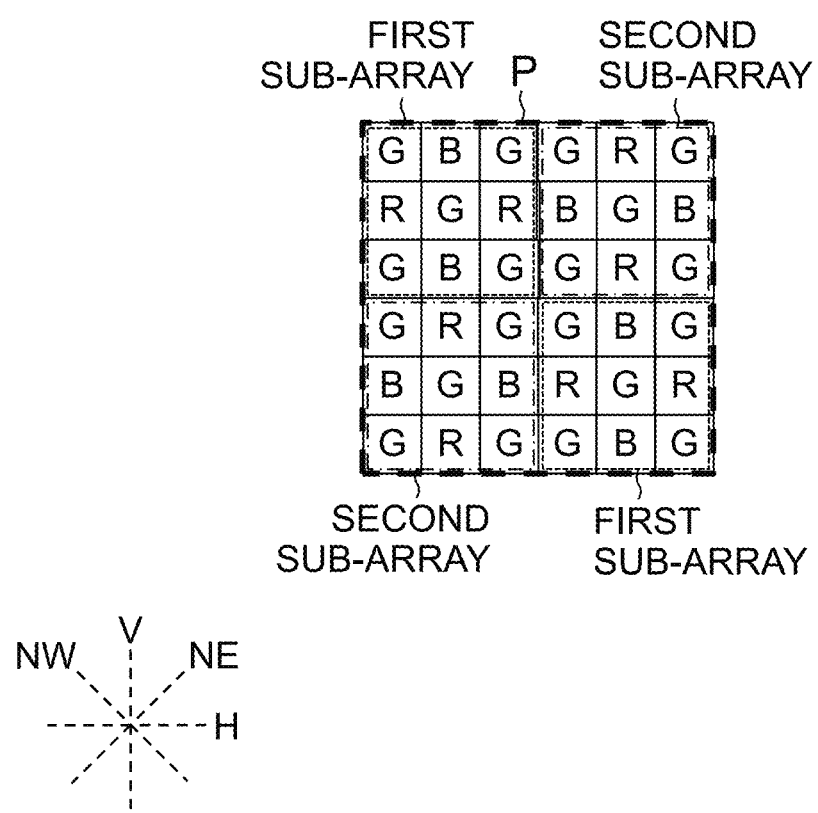
FIG. 20 is a plan view illustrating another example of a color filter array of imaging elements.

Moreover, a Bayer array (see FIG. 9) has been exemplified as a color filter array of the imaging element 26 in the above-mentioned example, the color filter array of the imaging element 26 is not especially limited, and, for example, the imaging element 26 may have the color filter array ("X-Trans (registered trademark)") illustrated in FIG. 20. The color filter array illustrated in FIG. 20 has basic array pattern P formed with a square array pattern corresponding to six pixels (horizontal direction H)×six pixels (vertical direction V), and the color filter of the imaging element 26 is formed by arranging this basic array pattern P in horizontal direction H and vertical direction V multiple times in a repeated manner.

In each basic array pattern P of the color filter array illustrated in FIG. 20, the first sub-array of three pixels (horizontal direction H)×three pixels (vertical direction V) and the second sub-array of three pixels (horizontal direction H)×three pixels (vertical direction V) are adjacently disposed in horizontal direction H and vertical direction V. In the first sub-array and the second sub-array, the G filter is disposed in four corners and the center, and the G filter is disposed on both diagonals. In the first sub-array, the R filter is set in horizontal direction H across the G filter at the center, and the B filter is set in vertical direction V across the G filter at the center. Meanwhile, in the second sub-array, the B filter is set in horizontal direction H across the G filter at the center, and the R filter is set in vertical direction V across the G filter at the center. Thus, the positional relationship between the R filter and the B filter is reversed between the first sub-array and the second sub-array, but the disposition of the G filter is similar.

In the color filter array illustrated in FIG. 20, one or more G filters corresponding to a color (green) that contributes most to obtain a luminance signal in general are disposed in each line in horizontal direction H, vertical direction V, diagonal upper right direction NE and diagonal upper left direction NW of the color filter array, and therefore it is possible to improve the reproducibility of demosaic processing in a high frequency region without depending on a direction with high frequency.

Moreover, the array direction of the color filter array (pixel array of the imaging element) is not especially limited, and it may be a direction with an arbitrary angle with respect to horizontal direction H and vertical direction V in FIG. 9 and FIG. 20. For example, it may be a so-called "honeycomb array" that rotates multiple pixels (color filter) two-dimensionally arrayed in horizontal direction H and vertical direction V by 45 degrees. Moreover, color filters of other colors than RGB may be used, and, for example, a transparent filter which is a filter that penetrates all of the light of a red wavelength region, the light of a blue wavelength region and the light of a green wavelength region and which has a relatively high light transmittance (for example, a light transmittance of 70% or more) in these wavelength regions, or a so-called white filter that has a lower transmittance than the transparent filter may be used as a color filter.

Moreover, the above-mentioned digital camera 10 is merely an example, and the present invention is also applicable to other configurations. Each functional configuration can be arbitrarily realized by arbitrary hardware, software or a combination of both of them. Therefore, for example, the present invention is also applicable to a program that causes a computer to execute a processing procedure in each above-mentioned device and processing unit (the point image restoration processing unit 36 and the filter generating device 40, and so on).

Application Example to EDoF System

The restoration processing in the above-mentioned embodiments is image processing to restore the essential object image by performing recovery correction of a point spread (point image blur) according to specific imaging conditions (for example, the diaphragm value, the F value, the focal distance and the lens type, and so on), but image restoration processing to which the present invention is applicable is not limited to the restoration processing in the above-mentioned embodiments. For example, the restoration processing according to the present invention is applicable even to restoration processing with respect to image data taken and acquired by an optical system (an imaging lens, and so on) having EDoF (Extended Depth of Field (Focus)). By performing the restoration processing on image data of a blurred image taken and acquired in a state where the extended depth of field (the depth of focus) is extended by the EDoF optical system, it is possible to restore and generate image data of high resolution in a focusing state in a wide range. In this case, restoration processing is performed using a restoration filter which is based on the point spread function (PSF, OTF, MTF and PTF, and so on) of the EDoF optical system and which has a filter coefficient set such that excellent image restoration is possible in the range of the extended depth of field (the depth of focus).

In the following, one example of a system (EDoF system) related to the restoration of image data taken and acquired through the EDoF optical system is described as follows. Here, an example of performing restoration processing on a luminance signal (Y data) obtained from image data (RGB data) after demosaic processing is described in the example shown below, but the timing at which the restoration processing is performed is not especially limited, and, for example, the restoration processing may be performed on "image data before demosaic processing (mosaic image data)" and "image data after the demosaic processing and before luminance signal conversion processing (demosaic image data)".

Figure 21:
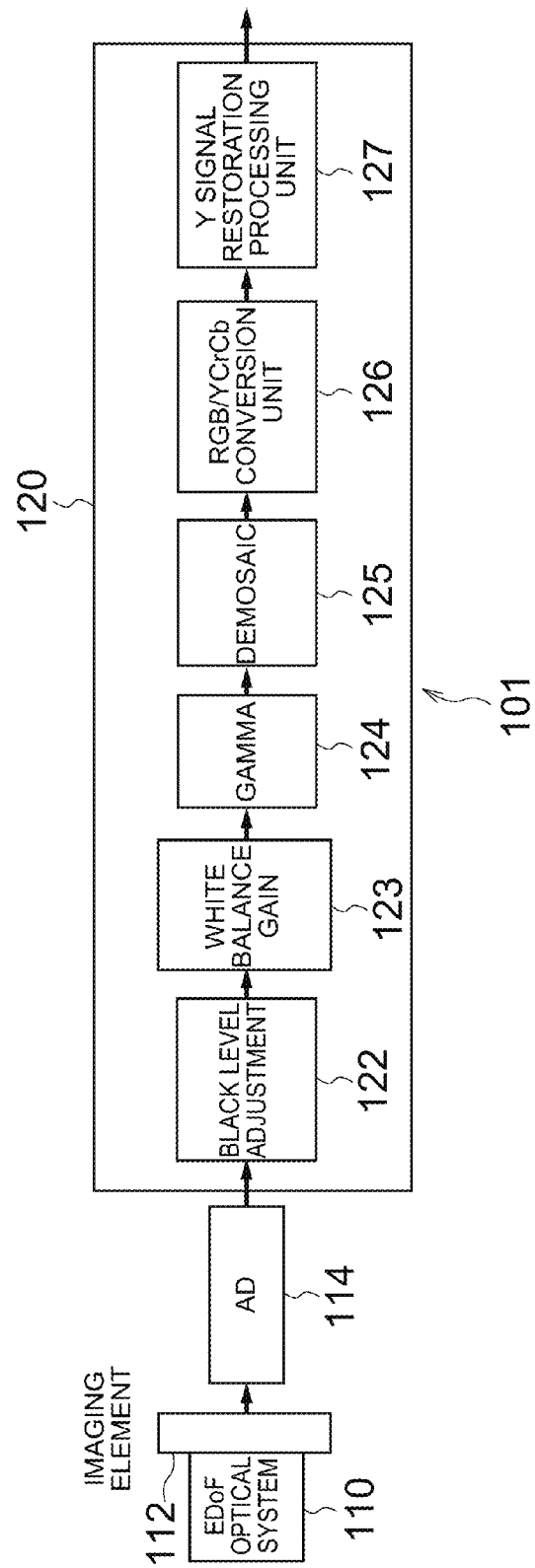
FIG. 21 is a block diagram illustrating one mode of an imaging module including an EDoF optical system.

FIG. 21 is a block diagram illustrating one mode of an imaging module 101 including the EDoF optical system. The imaging module 101 of this example (a digital camera, and so on) includes an EDoF optical system (lens unit) 110, an imaging element 112, an AD conversion unit 114 and a restoration processing block (image processing unit) 120.

Figure 22:
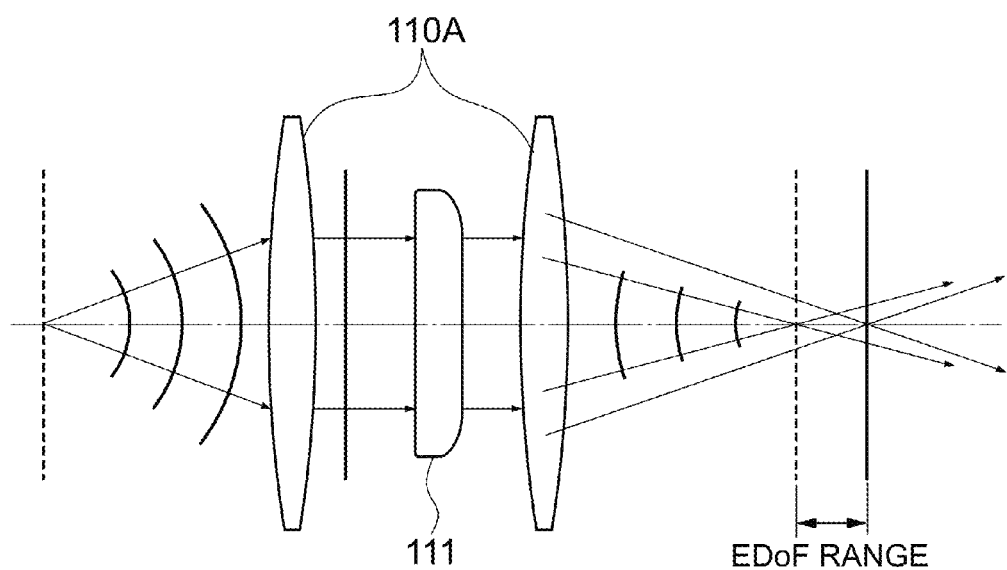
FIG. 22 is a diagram illustrating one example of the EDoF optical system.

FIG. 22 is a diagram illustrating one example of the EDoF optical system 110. The EDoF optical system 110 of this example includes an imaging lens 110A with fixed single focus and an optical filter 111 disposed in the pupil position. The optical filter 111 modulates a phase and achieves the EDoF of the EDoF optical system 110 (the imaging lens 110A) so as to obtain the extended depth of field (the depth of focus) (EDoF). Thus, the imaging lens 110A and the optical filter 111 form a lens unit that modulates a phase and extends the depth of field.

Here, the EDoF optical system 110 includes other components according to the necessity, and, for example, a diaphragm (illustration is omitted) is arranged near the optical filter 111. Moreover, one optical filter 111 may be provided or a combination of optical filters 111 may be provided. Moreover, the optical filter 111 is merely one example of optical phase modulation means, and the EDoF of the EDoF optical system 110 (the imaging lens 110A) may be realized by other means. For example, the EDoF of the EDoF optical system 110 may be realized by the imaging lens 110A lens-designed so as to have a function equivalent to the optical filter 111 of this example, instead of installing the optical filter 111.

That is, the EDoF of the EDoF optical system 110 can be realized by various means for changing the wavefront of an image formed on the light receiving surface of the imaging element 112. For example, "an optical element whose thickness changes", "an optical element whose refractive index changes (a refractive-index-distribution-type wavefront modulation lens, and so on)", "an optical element whose thickness or refractive index changes by coding to a lens surface, and so on (a wavefront modulation hybrid lens and an optical element formed as a phase surface on a lens face, and so on)" and "a liquid crystal element that can modulate the phase distribution of light (a liquid crystal spatial phase modulation element, and so on)" may be adopted as EDoF means of the EDoF optical system 110. Thus, the present invention is applicable to not only a case where regularly dispersed images can be formed by an optical wavefront modulation element (the optical filter 111 (phase plate)) but also a case where distributed images similar to the case of using the optical wavefront modulation element can be formed by the imaging lens 110A itself without using the optical wavefront modulation element.

The EDoF optical system 110 illustrated in FIG. 22 can be miniaturized because a focus adjustment mechanism that mechanically performs focus adjustment can be omitted, and it can be suitably mounted to a camera-equipped mobile phone and a portable information terminal.

An optical image after passing through the EDoF optical system 110 subjected to EDoF is formed on the imaging element 112 illustrated in FIG. 21 and converted into an electrical signal.

The imaging element 112 is formed by multiple pixels disposed in a predetermined pattern array (a Bayer array, a G stripe R/G full-checkered pattern, an X-Trans array and a honeycomb array, and so on) in a matrix manner, and each pixel is formed including a microlens, a color filter (an RGB color filter in this example) and a photodiode. An optical image that enters into the light receiving surface of the imaging element 112 through the EDoF optical system 110 is converted into a signal charge of an amount corresponding to an incident light quantity by each photodiode arrayed on the light receiving surface. Further, the signal charge of R/G/B accumulated in each photodiode is sequentially output as the voltage signal (image signal) of each pixel.

The AD conversion unit 114 converts an analog R/G/B image signal output from the imaging element 112 every pixel into a digital R/G/B image signal. The digital image signal digitally converted into an image signal by the AD conversion unit 114 is added to the restoration processing block 120.

For example, the restoration processing block 120 includes a black level adjustment unit 122, a white balance gain unit 123, a gamma processing unit 124, a demosaic processing unit 125, an RGB/YCrCb conversion unit 126 and a Y signal restoration processing unit 127.

The black level adjustment unit 122 performs black level adjustment of the digital image signal output from the AD conversion unit 114. A known method may be adopted for black level adjustment. For example, in a case where a certain effective photoelectric conversion element is paid attention to, the black level adjustment is performed by: calculating the average of a dark current amount acquisition signal corresponding to each of multiple OB photoelectric conversion elements included in a photoelectric conversion element row including the effective photoelectric conversion element; and subtracting the average from a dark current amount acquisition signal corresponding to the effective photoelectric conversion element.

The white balance gain unit 123 performs gain adjustment corresponding to the white balance gain of each color signal of RGB included in the digital image signal in which the black level data is adjusted.

The gamma processing unit 124 performs gamma correction to perform gradation correction of a half tone or the like such that the R/G/B image signal subjected to white balance adjustment becomes a desired gamma characteristic.

The demosaic processing unit 125 performs demosaic processing on the R/G/B image signal after the gamma correction. Specifically, the demosaic processing unit 125 generates a combination of image signals (the R signal, the G signal and the B signal) output from each light receiving pixel of the imaging element 112 by performing color interpolation processing on the R/G/B image signal. That is, the image signal from each light receiving pixel is one of RGB image signals before color demosaic processing, and a combination of three pixel signals of RGB signals corresponding to respective light receiving pixels is assumed to be output after the color demosaic processing.

The RGB/YCrCb conversion unit 126 converts the R/G/B signal of each pixel after demosaic processing into luminance signal Y and color difference signals Cr and Cb, and outputs luminance signal Y and color difference signals Cr and Cb of each pixel.

The Y signal restoration processing unit 127 performs restoration processing on luminance signal Y from the RGB/YCrCb conversion unit 126 on the basis of a restoration filter stored beforehand. For example, the restoration filter is formed with a deconvolution kernel (corresponding to the tap number of M=7 and N=7) having a kernel size of 7×7 and an operation coefficient (corresponding to restoration gain data and filter coefficient) corresponding to the deconvolution kernel, and it is used for deconvolution processing (reverse convolution operation processing) for the phase modulation of the optical filter 111. Here, as for the restoration filter, the one corresponding to the optical filter 111 is stored in an unillustrated memory (for example, a memory in which the Y signal restoration processing unit 127 is installed in an associated manner). Moreover, the kernel size of the deconvolution kernel is not limited to 7×7.

Figure 23:
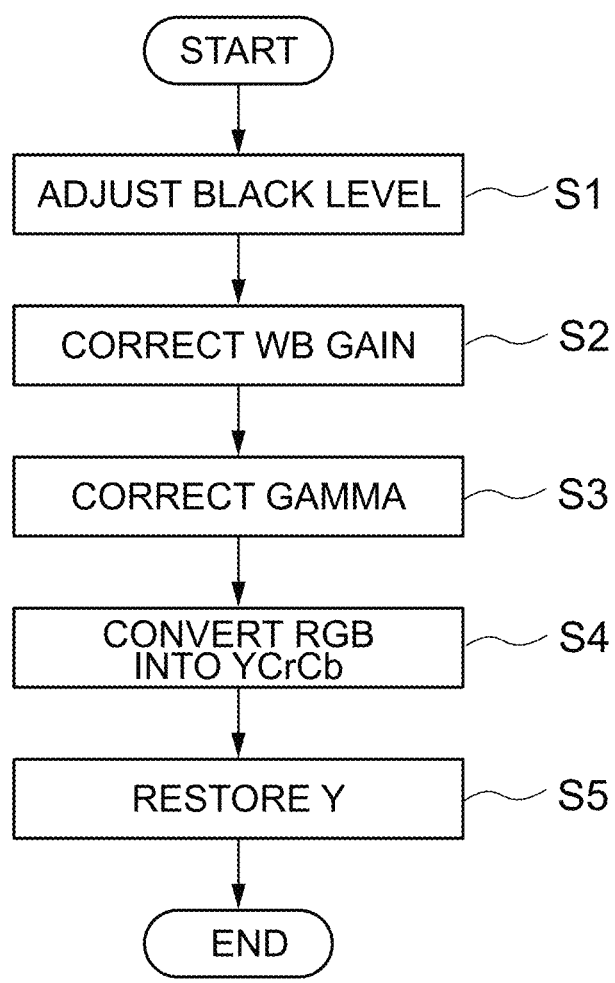
FIG. 23 is a flowchart illustrating one example of restoration processing in a restoration processing block illustrated in FIG. 21.

Next, restoration processing by the restoration processing block 120 is described. FIG. 23 is a flowchart illustrating one example of the restoration processing in the restoration processing block 120 illustrated in FIG. 21.

The digital image signal from the AD conversion unit 114 is added as one input of the black level adjustment unit 122, the black level data is added as the other input, and the black level adjustment unit 122 subtracts the black level data from the digital image signal and outputs the digital image signal from which the black level data is subtracted, to the white balance gain unit 123 (step S1). By this means, the black level component is not included in the digital image signal, and the digital image signal indicating the black level becomes 0.

Processing by the white balance gain unit 123 and the gamma processing unit 124 is sequentially performed on the image data after black level adjustment (steps S2 and S3).

After the R/G/B signal subjected to gamma correction is subjected to demosaic processing in the demosaic processing unit 125, it is converted into luminance signal Y and chroma signals Cr and Cb in the RGB/YCrCb conversion unit 126 (step S4).

The Y signal restoration processing unit 127 performs restoration processing to perform deconvolution processing for the phase modulation of the optical filter 111 of the EDoF optical system 110, on luminance signal Y (step S5). That is, the Y signal restoration processing unit 127 performs deconvolution processing (reverse convolution operation processing) of a luminance signal (here, a luminance signal of 7×7 pixels) corresponding to a pixel group of a predetermined unit centering on an arbitrary processing target pixel and a restoration filter (a 7×7 deconvolution kernel and the operation coefficient thereof) stored in a memory or the like beforehand. The Y signal restoration processing unit 127 performs restoration processing to remove an image blur of the entire image by repeating the deconvolution processing for each pixel group of this predetermined unit so as to cover the entire region of the imaging surface. The restoration filter is defined according to the position of the center of the pixel group on which the deconvolution processing is performed. That is, a common restoration filter is applied to adjacent pixel groups. It is preferable that the common restoration filter is applied to all pixel groups to further simplify the restoration processing.

Figure 24:
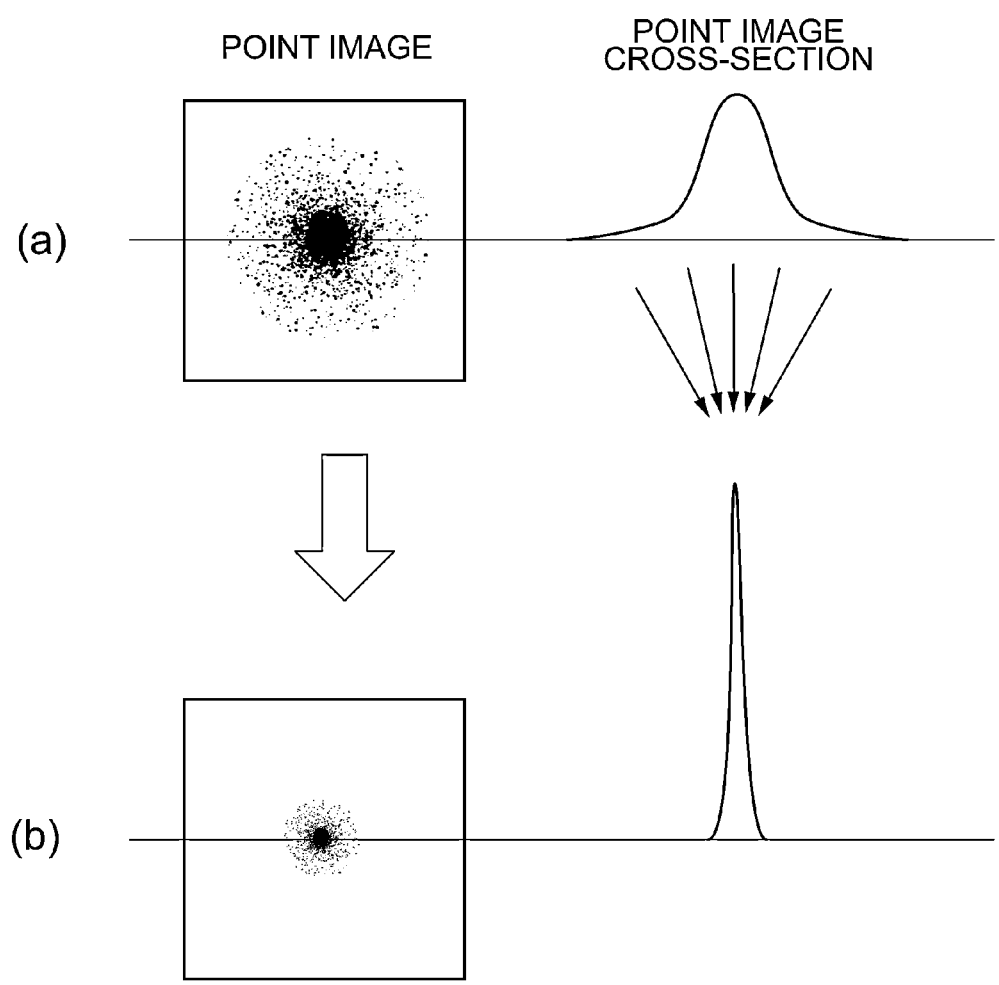
FIG. 24 is a diagram illustrating a restoration example of an image acquired through an EDoF optical system.

The point image (optical image) of a luminance signal after passing through the EDoF optical system 110 is formed on the imaging element 112 as a large point image (blurred image) as illustrated in (a) portion of FIG. 24, but it is restored to a small point image (high-resolution image) as illustrated in (b) portion of FIG. 24 by deconvolution processing in the Y signal restoration processing unit 127.

By performing restoration processing on a luminance signal after demosaic processing as mentioned above, it does not have to provide the parameters of restoration processing for each of RGB, and it is possible to speed up the restoration processing. Moreover, instead of combining RGB image signals corresponding to RGB pixels in discontinuous positions into one unit and performing deconvolution processing, since the luminance signals of adjacent pixels are combined in a predetermined unit and deconvolution processing is performed while applying a common restoration filter to the unit, the accuracy of the restoration processing improves. Here, as for color difference signals Cr and Cb, because of the characteristic of sight by person's eyes, they are permitted in the viewpoint of image quality even if the resolution is not increased by the restoration processing. Moreover, since the color difference signal is compressed at a higher compressibility than the luminance signal in a case where an image is recorded in a compressed format such as JPEG, there is less necessity to increase the resolution by the restoration processing. Thus, it is possible to simultaneously achieve the improvement of restoration accuracy and the simplification and speed-up of processing.

The point image restoration processing according to each embodiment of the present invention is applicable to restoration processing of the EDoF system as described above. That is, the restoration processing in the point image restoration processing unit 36 of each embodiment described above is applied to the restoration processing in the Y signal restoration processing unit 127 of this EDoF system, and the restoration filter used in the Y signal restoration processing unit 127 can "be generated by combining multiple base filters so as to fit to an ideal filter (a Wiener filter, and so on) based on a point spread function", "be generated by combining multiple base filters that do not cause ringing in recovery image data obtained in a case where restoration processing using each of them alone is performed on original image data", and "be generated by combining multiple base filters that do not emphasize return noise in the recovery image data obtained in a case where the restoration processing using each of them alone is performed on the original image data".

Here, a mode where the point image restoration processing unit 36 is installed in the camera body 14 (the camera body controller 28) of the digital camera 10 in the each embodiment described above, but the point image restoration processing unit 36 may be installed in other devices such as the computer 60 and the server 80.

For example, when image data is processed in the computer 60, point image restoration processing of this image data may be performed by a point image restoration processing unit installed in the computer 60. Moreover, in a case where the server 80 includes the point image restoration processing unit, for example, it may be designed such that image data is transmitted from the digital camera 10 or the computer 60 to the server 80, the point image restoration processing is performed on this image data in the point image restoration processing unit of the server 80 and the image data after the point image restoration processing (recovery image data) is transmitted and provided to the transmission source.

Moreover, a mode to which the present invention is applicable is not limited to the digital camera 10, the computer 60 and the server 80, and it is also applicable to mobile equipment having other functions (a telephone call function, a communication feature and other computer functions) than imaging in addition to an imaging function, besides cameras having a main function of imaging. As other modes to which the present invention is applicable, for example, there are mobile phones and smart phones having a camera function, PDAs (Personal Digital Assistants) and portable game machines, and so on. In the following, one example of a smart phone to which the present invention is applicable is described.

<Configuration of Smart Phone>

Figure 25:
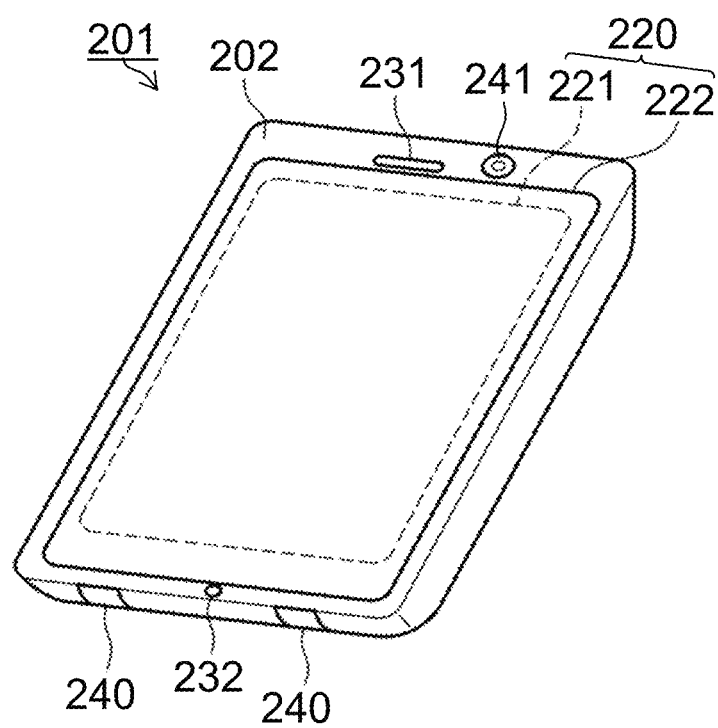
FIG. 25 is an outline drawing of a smart phone.

FIG. 25 illustrates the appearance of the smart phone 201 that is an embodiment of the imaging device of the present invention. The smart phone 201 illustrated in FIG. 25 includes a tabular chassis 202, and a display input unit 220 that combines a display panel 221 as a display unit and an operation panel 222 as an input unit is installed on one surface of the chassis 202. Moreover, this chassis 202 includes a speaker 231, a microphone 232, an operation unit 240 and a camera unit 241. Moreover, the configuration of the chassis 202 is not limited to this, and, for example, it is possible to adopt a configuration in which the display unit and the input unit are independent, and adopt a configuration of a folding structure and a slide mechanism.

Figure 26:
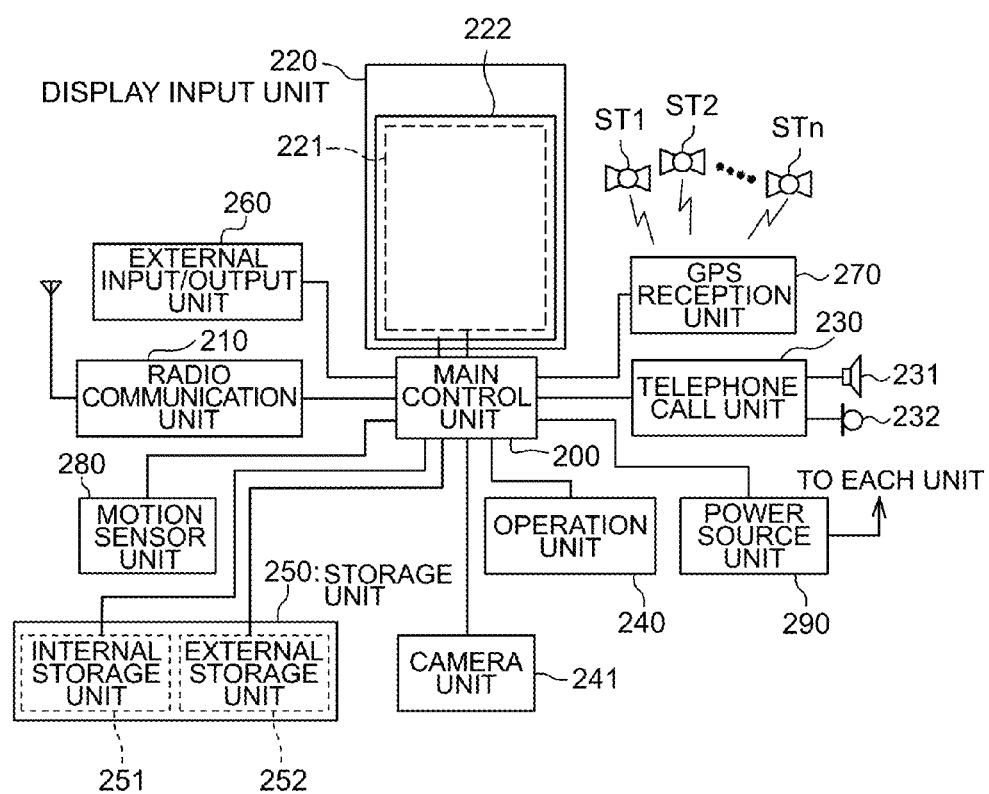
FIG. 26 is a block diagram illustrating the configuration of the smart phone illustrated in FIG. 25.

FIG. 26 is a block diagram illustrating the configuration of the smart phone 201 illustrated in FIG. 25. As illustrated in FIG. 26, main components of the smart phone include a radio communication unit 210, the display input unit 220, a call unit 230, the operation unit 240, the camera unit 241, a storage unit 250, an external input/output unit 260, a GPS (Global Positioning System) reception unit 270, a motion sensor unit 280, a power source unit 290 and a main control unit 200. Moreover, main functions of the smart phone 201 include a radio communication function to perform mobile radio communication through base station device BS and mobile communication network NW.

The radio communication unit 210 performs radio communication with base station device BS housed in mobile communications network NW according to an instruction of the main control unit 200. This radio communication is used to transmit and receive email data and various kinds of file data such as voice data and image data, and so on, and receive web data and streaming data, and so on.

The display input unit 220 is a so-called touch panel that displays an image (still image and moving image) and character information, and so on, by control of the main control unit 200, visually conveys information to the user and detects the user operation with respect to the displayed information, and includes the display panel 221 and the operation panel 222.

The display panel 221 uses an LCD (Liquid Crystal Display) and an OELD (Organic Electro-Luminescence Display), and so on, as a display device. The operation panel 222 is a device that is placed such that an image displayed on the display surface of the display panel 221 can be visually recognized, and detects one or multiple coordinates operated by user's finger or stylus. When this device is operated by user's finger or stylus, a detection signal generated in response to the operation is output to the main control unit 200. Next, the main control unit 200 detects the operation position (coordinates) on the display panel 221 on the basis of the received detection signal.

As illustrated in FIG. 25, the display panel 221 and the operation panel 222 of the smart phone 201 exemplified as an embodiment of the imaging device of the present invention are configured to integrally form the display input unit 220, and the operation panel 222 is disposed so as to completely cover the display panel 221. In a case where this disposition is adopted, the operation panel 222 may have a function to detect user's operation even in an area outside the display panel 221. In other words, the operation panel 222 may include a detection area about an overlapping part that overlaps with the display panel 221 (hereafter referred to as "display area") and a detection area about the remaining outer edge part that does not overlap with the display panel 221 (hereafter referred to as "non-display area").

Here, the size of the display area and the size of the display panel 221 may be completely matched, but both of them do not have to be necessarily matched. Moreover, the operation panel 222 may include two sensitive areas of the outer edge part and the remaining inner part. In addition, the width of the outer edge part is arbitrarily designed according to the size of the chassis 202, and so on. Furthermore, as a position detection system adopted in the operation panel 222, there are assumed a matrix switch system, a resistance film system, a surface elastic wave system, an infrared ray system, an electromagnetic induction system and an electrostatic capacity system, and so on, and any system can be adopted.

The communication unit 230 includes the speaker 231 and the microphone 232, converts user's voice input through the microphone 232 into processable voice data in the main control unit 200 and outputs it to the main control unit 200, and decodes voice data received by the radio communication unit 210 or the external input/output unit 260 and outputs it from the speaker 231. Moreover, as illustrated in FIG. 25, for example, it is possible to mount the speaker 231 to the same surface as a surface on which the display input unit 220 is installed, and mount the microphone 232 to the side surface of the chassis 202.

The operation unit 540 is a hardware key using a key switch, and so on, and accepts an instruction from the user. For example, as illustrated in FIG. 25, the operation unit 240 is a push-button switch that is mounted to the side surface of the chassis 202 of the smart phone 201, turned on when being pressed by a finger or the like, and enters in an OFF state by the restoring force of a spring or the like when the finger is released.

The storage unit 250 stores a control program or control data of the main control unit 200, application software, address data associating the name and telephone number of the communicating party, data of transmitted/received email, Web data downloaded by Web browsing and downloaded content data, and temporarily stores streaming data, and so on. Moreover, the storage unit 250 is formed with an internal storage unit 251 in the smart phone and an external storage unit 252 having a detachable external memory slot. Here, each of the internal storage unit 251 and the external storage unit 252 forming the storage unit 250 are realized using a storage medium such as a memory of the flash memory type, hard disk type, multimedia card micro type or card type (for example, Micro SD (registered trademark) memory, and so on), a RAM (Random Access Memory) and a ROM (Read Only Memory), and so on.

The external input/output unit 260 plays a role of an interface with all external equipment coupled with the smart phone 201, and directly or indirectly connects with other external equipment by communication (for example, universal serial bus (USB) and IEEE1394, and so on) or network (for example, Internet, wireless LAN, Bluetooth (registered trademark), RFID (Radio Frequency Identification), infrared data association (IrDA) (registered trademark), UWB (Ultra Wideband) (registered trademark) and ZigBee (registered trademark), and so on). As external equipment coupled with the smart phone 201, for example, there are a wired/wireless headset, a wired/wireless external charger, a wired/wireless data port, a memory card or SIM (Subscriber Identity Module)/UIM (User Identity Module) card connected through a card socket, external audio/video equipment connected through an audio/video I/O (Input/Output) terminal, external audio/video equipment connected in a wireless manner, a smart phone connected in a wired/wireless manner, a PDA connected in a wired/wireless manner, a personal computer connected in a wired/wireless manner and earphones, and so on. The external input/output unit can convey data transmitted from such an external device, to each component in the smart phone 201, and transmit data in the smart phone 201 to the external device.

The GPS reception unit 270 receives GPS signals transmitted from GPS satellites ST1 to STn according to an instruction of the main control unit 200, performs positioning operation processing based on multiple received GPS signals, and detects a position formed with the latitude, longitude and altitude of the smart phone 201. When it is possible to acquire position information from the radio communication unit 210 or the external input/output unit 260 (for example, wireless LAN), the GPS reception unit 270 can detect the position by the use of the position information.

For example, the motion sensor unit 280 includes a three-axis acceleration sensor, and detects a physical motion of the smart phone 201 according to an instruction of the main control unit 200. By detecting the physical motion of the smart phone 201, the motion direction or acceleration of the smart phone 201 is detected. This detection result is output to the main control unit 200.

The power source unit 290 supplies power accumulated in a battery (not illustrated) to each part of the smart phone 201 according to an instruction of the main control unit 200.

The main control unit 200 includes a microprocessor, performs operation according to a control program or control data stored in the storage unit 250 and integrally controls each part of the smart phone 201. Moreover, in order to perform voice communication and data communication through the radio communication unit 210, the main control unit 200 has a mobile communication control function to control each part of the communication system, and an application processing function.

The application processing function is realized when the main control unit 200 performs operation according to application software stored in the storage unit 250. As the application processing function, for example, there are an infrared data association function to control the external input/output unit 260 and perform data communication with opposing equipment, an email function to transmit/receive email, and a Web browsing function to browse a Web page, and so on.

Moreover, the main control unit 200 has an image processing function to display a picture on the display input unit 220 on the basis of image data (still image or moving image data) such as reception data and downloaded streaming data, and so on. The image processing function denotes a function that the main control unit 200 decodes the above-mentioned image data, performs image processing on this decoding result and displays an image on the display input unit 220.

In addition, the main control unit 200 performs display control with respect to the display panel 221 and operation detection control to detect user operation through the operation unit 240 and the operation panel 222.

By performing the display control, the main control unit 200 displays an icon to activate application software or a software key such as a scroll bar, or displays a window to create email. Here, the scroll bar denotes a software key to accept an instruction that moves the display part of an image which is a large image that cannot be settled in the display area of the display panel 221.

Moreover, by performing the operation detection control, the main control unit 200 detects the user operation through the operation unit 240, accepts operation with respect to the above-mentioned icon or an input of a character string with respect to the entry field of the above-mentioned window through the operation panel 222, or accepts a scroll request of a display image through the scroll bar.

In addition, by performing the operation detection control, the main control unit 200 has a touch panel control function to: determine whether the operation position with respect to the operation panel 222 is an overlapping part (display area) that overlaps with the display panel 221 or it is the remaining outer edge part (non-display area) that does not overlap with the display panel 221; and control the sensitive area of the operation panel 222 and the display position of a software key.

Moreover, the main control unit 200 can detect gesture operation with respect to the operation panel 222 and execute a preset function according to the detected gesture operation. The gesture operation does not mean simple touch operation in the related art but means operation to draw a trajectory by a finger or the like, specify multiple positions at the same time or combine these and draw a trajectory about at least one of multiple positions.

The camera unit 241 is a digital camera that takes an electronic image by the use of imaging elements such as a CMOS (Complementary Metal Oxide Semiconductor) and a CCD (Charge-Coupled Device). Moreover, by the control of the main control unit 200, for example, the camera unit 241 can convert image data acquired by imaging into compressed image data like JPEG (Joint Photographic coding Experts Group), record it in the storage unit 250 and output it through the external input/output unit 260 or the radio communication unit 210. In the smart phone 201 illustrated in FIG. 25, the camera unit 241 is mounted to the same surface as the display input unit 220, but the mounting position of the camera unit 241 is not limited to this, and, for example, the camera unit 241 may be mounted to the back of the display input unit 220 or multiple cameras 241 may be mounted. Here, in a case where multiple cameras 241 are mounted, the camera unit 241 provided for imaging can be switched to take an image alone, or multiple cameras 241 can be used at the same time to take an image.

Moreover, the camera unit 241 can be used for various functions of the smart phone 201. For example, it is possible to display an image acquired by the camera unit 241 on the display panel 221 or use the image of the camera unit 241 as one of operation inputs of the operation panel 222. Moreover, when the GPS reception unit 270 detects a position, it is possible to detect the position with reference to the image from the camera unit 241. Furthermore, with reference to the image from the camera unit 241, it is possible to determine the optical axis direction of the camera unit 241 of the smart phone 201 and determine the current use environment without using the three-axis acceleration sensor or by using the three-axis acceleration sensor together. Naturally, it is possible to use the image from the camera unit 241 in application software.

Additionally, it is possible to attach position information acquired by the GPS reception unit 270, voice information (which may be text information by performing voice text conversion by the main control unit, and so on) acquired by the microphone 232 and attitude information acquired by the motion sensor unit 280, and so on, to image data of a still image or moving image and record it in the storage unit 250, or output it through the input/output unit 260 or the radio communication unit 210.

In above-mentioned the smart phone 201, for example, each above-mentioned processing unit related to point image restoration processing can be arbitrarily realized by the main control unit 200 and the storage unit 250, and so on.

It is needless to say that the present invention is not limited to the above-mentioned embodiments and various changes can be made without departing from the spirit of the present invention.

What is claimed is:

1. An image processing device, comprising:
processing circuitry that performs restoration processing using a restoration filter based on a point spread function of an optical system, on original image data obtained from an imaging element by imaging using the optical system, to obtain recovery image data,
wherein the restoration filter includes a combination filter generated by combining multiple base filters so as to fit to an ideal filter based on the point spread function.

2. The image processing device according to claim 1, wherein the multiple base filters are filters that do not cause ringing in recovery image data obtained in a case where restoration processing using each of the multiple base filters alone is performed on the original image data.

3. The image processing device according to claim 1, wherein the multiple base filters are filters that do not emphasize return noise in recovery image data obtained in a case where restoration processing using each of the multiple base filters alone is performed on the original image data.

4. An image processing device, comprising:
processing circuitry that performs restoration processing using a restoration filter based on a point spread function of an optical system, on original image data obtained from an imaging element by imaging using the optical system, to obtain recovery image data,
wherein the restoration filter includes a combination filter generated by combining multiple base filters that do not cause ringing in recovery image data obtained in a case where restoration processing using each of the multiple base filters alone is performed on the original image data.

5. An image processing device, comprising:
processing circuitry that performs restoration processing using a restoration filter based on a point spread function of an optical system, on original image data obtained from an imaging element by imaging using the optical system, to obtain recovery image data,
wherein the restoration filter includes a combination filter generated by combining multiple base filters that do not emphasize return noise in recovery image data obtained in a case where restoration processing using each of the multiple base filters alone is performed on the original image data.

6. The image processing device according to claim 1, comprising:
an image information acquisition unit that acquires image information including at least one of image analysis data acquired by analyzing the original image data and image acquisition condition data showing an acquisition condition of the original image data;
a filter selection unit that selects the restoration filter based on the image information; and
a restoration operation unit that obtains recovery image data by performing restoration processing using the restoration filter selected by the filter selection unit, on the original image data, wherein:
the restoration filter includes an ideal filter based on the point spread function and the combination filter; and
the filter selection unit selects any one of the ideal filter and the combination filter as the restoration filter used for the restoration processing, based on the image information.

7. The image processing device according to claim 6, wherein:
the image information acquisition unit acquires the image information including the image analysis data showing whether pixel data with a saturated pixel value or pixel data having a pixel value larger than a threshold is included in the original image data;
the filter selection unit selects the combination filter in a case where the image analysis data shows that the pixel data with the saturated pixel value or the pixel data having the pixel value larger than the threshold is included in the original image data; and
the filter selection unit selects the ideal filter in a case where the image analysis data does not show that the pixel data with the saturated pixel value or the pixel data having the pixel value larger than the threshold is included in the original image data.

8. The image processing device according to claim 6, further comprising an edge detection unit that detects an edge part in an image of the original image data, wherein:

the image information acquisition unit acquires the image information including the image analysis data showing whether pixel data with a saturated pixel value or pixel data having a pixel value larger than a threshold is included in the edge part in the original image data;

the filter selection unit selects the combination filter in a case where the image analysis data shows that the pixel data with the saturated pixel value or the pixel data having the pixel value larger than the threshold is included in the edge part in the original image data; and the filter selection unit selects the ideal filter in a case where the image analysis data does not show that the pixel data with the saturated pixel value or the pixel data having the pixel value larger than the threshold is included in the edge part in the original image data.

9. The image processing device according to claim 6, wherein:

the image information acquisition unit acquires the image information including the image acquisition condition data showing information on the optical system;

the filter selection unit selects the ideal filter in a case where the ideal filter corresponds to the optical system; and the filter selection unit selects the combination filter in a case where the ideal filter does not correspond to the optical system.

10. The image processing device according to claim 6, wherein the filter selection unit selects one of the ideal filter and the combination filter as the restoration filter used for the restoration processing, for each of the original image data.

11. The image processing device according to claim 6, wherein, based on the image information on a noted pixel and a peripheral pixel of the noted pixel in the original image data, the filter selection unit selects any one of the ideal filter and the combination filter as the restoration filter used for the restoration processing with respect to the noted pixel, for each pixel data forming the original image data.

12. The image processing device according to claim 1, wherein:

the imaging element includes color filters of multiple colors; and the restoration filter has a frequency characteristic corresponding to an array of the color filters.

13. The image processing device according to claim 1, wherein:

respective frequency characteristics of the multiple base filters are mutually different; and the combination filter is obtained from a linear sum of the multiple base filters.

14. The image processing device according to claim 13, wherein a weighting coefficient with respect to each of the multiple base filters is calculated by a least-squares method.

15. The image processing device according to claim 1, wherein the multiple base filters are filters having a frequency characteristic for contour correction.

16. The image processing device according to claim 1, wherein the restoration filter has a filter coefficient corresponding to a pixel number of the original image data.

17. The image processing device according to claim 1, wherein the optical system has a lens unit that modulates a phase and expands depth of field.

18. An image capture device comprising:

the image processing device according to claim 1; and the imaging element that receives light through the optical system and outputs the original image data of an object image.

19. The image processing device according to claim 1, wherein:

at least one of the multiple base filters is selected based on a visual characteristic.

* * * * *